(12) United States Patent
Chai et al.

(10) Patent No.: US 12,512,147 B2
(45) Date of Patent: Dec. 30, 2025

(54) APPARATUS AND METHOD FOR PROGRAMMING DATA INTO NON-VOLATILE MEMORY DEVICE

(71) Applicant: SK hynix Inc., Gyeonggi-do (KR)

(72) Inventors: Soo Yeol Chai, Gyeonggi-do (KR); Hee Joo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 254 days.

(21) Appl. No.: 18/348,366

(22) Filed: Jul. 7, 2023

(65) Prior Publication Data

US 2024/0290377 A1    Aug. 29, 2024

(30) Foreign Application Priority Data

Feb. 24, 2023   (KR) ........................ 10-2023-0024883

(51) Int. Cl.
*G11C 11/4096* (2006.01)
*G11C 11/4078* (2006.01)
*G11C 11/4093* (2006.01)

(52) U.S. Cl.
CPC ...... *G11C 11/4096* (2013.01); *G11C 11/4078* (2013.01); *G11C 11/4093* (2013.01)

(58) Field of Classification Search
CPC ............ G11C 11/4096; G11C 11/4078; G11C 11/4093; G11C 11/5628; G11C 16/08; G11C 16/10; G11C 16/24; G11C 16/26; G11C 16/30; G11C 16/32; G11C 16/3459; G11C 16/0483

USPC .................................................... 365/189.011
See application file for complete search history.

(56) References Cited

U.S. PATENT DOCUMENTS

| | | | |
|---|---|---|---|
| 8,743,623 B2 | 6/2014 | Cho et al. | |
| 2019/0156904 A1* | 5/2019 | Hong | G11C 16/10 |
| 2020/0372945 A1* | 11/2020 | Kang | G11C 16/24 |
| 2021/0027840 A1* | 1/2021 | Park | G11C 16/08 |
| 2021/0210146 A1* | 7/2021 | Lee | G11C 16/30 |

FOREIGN PATENT DOCUMENTS

KR   10-2020-0118713 A   10/2020

* cited by examiner

*Primary Examiner* — Amir Zarabian
*Assistant Examiner* — Minh Dinh
(74) *Attorney, Agent, or Firm* — IP & T GROUP LLP

(57) ABSTRACT

A memory device comprising: a memory cell array, and a controller configured to connect, in a first interval equal to or longer than a bit line setup interval, each of first and second bit lines, which are connected to cells respectively having first and second program states, to a node of a first permission voltage, connect, in the first interval, a third bit line, which is connected to a cell having a program prohibition state, to a node of a prohibition voltage, maintain, in a second interval that is equal to or shorter than a program pulse application interval, the respective connections of the first bit line and the third bit line, and disconnect, in the second interval, the second bit line from the node of the first permission voltage to apply the second bit line with a second permission voltage.

18 Claims, 13 Drawing Sheets

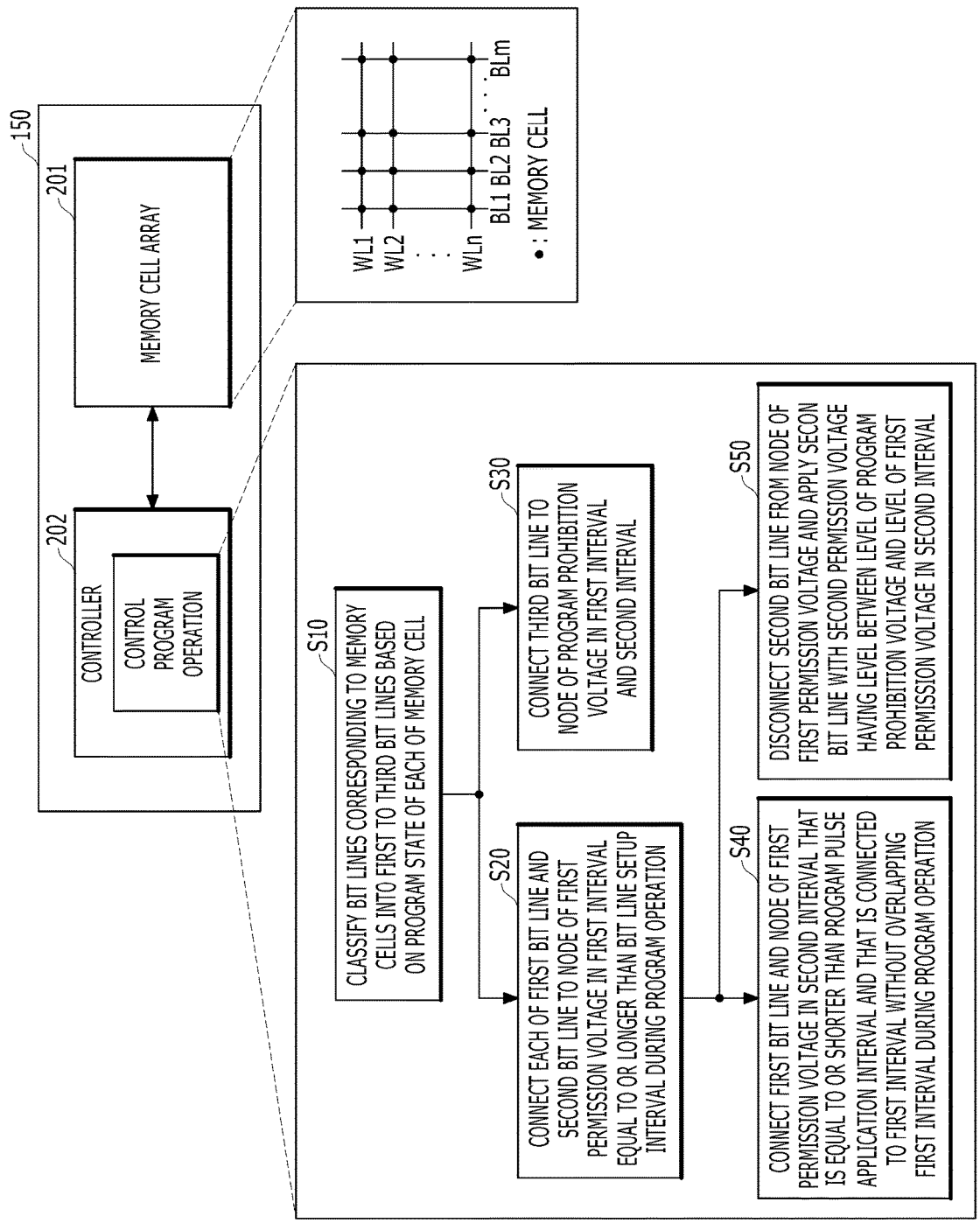

FIG. 6

|  | FIRST_BL | SECOND_BL | THIRD_BL |
|---|---|---|---|
| QD_N | 0 | 1 | 1 |
| QS_N | 0 | 0 | 1 |

APPARATUS AND METHOD FOR PROGRAMMING DATA INTO NON-VOLATILE MEMORY DEVICE

CROSS-REFERENCE TO RELATED APPLICATION

This application claims priority under 35 U.S.C. § 119 to Korean Patent Application No. 10-2023-0024883 filed on Feb. 24, 2023, which is incorporated herein by reference in its entirety.

BACKGROUND

1. Field

Various embodiments relate to a memory device, and particularly, to an apparatus and method for stably programming data into a nonvolatile memory device.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories are chiefly classified into a NOR-type memory and NAND-type memory.

A cell of a nonvolatile memory device is an element on which electrical program/erase operations can be performed. The program and erase operations may be performed by changing the threshold voltage of the cell as electrons are moved by a strong electric field that is applied to a thin oxide film.

A program operation on multiple memory cells that are included in a nonvolatile memory device may include a bit line setup interval in which the potential levels of bit lines to which memory cells selected as a program target are connected is set, a program pulse application interval in which a program pulse is applied to a word line to which the memory cells selected as the program target are connected, and a verification interval in which it is determined whether the threshold voltage level of the memory cells selected as the program target has reached a target voltage level.

When the potential levels of the bit lines are set in the bit line setup interval during the program operation, a phenomenon in which the targeted potential levels of the bit lines are disturbed without maintaining the potential levels may occur due to a coupling effect between adjacent bit lines. Accordingly, an issue in that the program operation becomes unstable may occur.

SUMMARY

Various embodiments of the present disclosure are directed to a memory device capable of stably maintaining the potential levels of bit lines in a bit line setup interval and a program pulse application interval, and an operating method thereof.

Technical objects to be achieved by the present disclosure are not limited to the aforementioned object, and the other objects not described above may be evidently understood from the following description by a person having ordinary knowledge in the art to which the present disclosure pertains.

According to an embodiment of the present disclosure, a memory device may include: a memory cell array comprising multiple memory cells that are connected between multiple word lines and multiple bit lines; and a controller configured to: connect, in a first interval equal to or longer than a bit line setup interval, each of first and second bit lines, which are connected to cells respectively having first and second program states among the multiple memory cells, to a node of a first permission voltage, connect, in the first interval, a third bit line, which is connected to a cell having a program prohibition state, to a node of a prohibition voltage, maintain, in a second interval that is equal to or shorter than a program pulse application interval and subsequent to the first interval, the respective connections of the first bit line and the third bit line, and disconnect, in the second interval, the second bit line from the node of the first permission voltage to apply the second bit line with a second permission voltage having a level between a level of the prohibition voltage and a level of the first permission voltage.

According to an embodiment of the present disclosure, an operating method of a memory device, may include: performing a bit line setup operation between first timing and second timing; performing a program pulse application operation between the second timing and third timing; connecting first and second bit lines, which are connected to cells having first and second program states, to a node of a first permission voltage and connecting a third bit line, which is connected to a cell having a program prohibition state, to a node of a prohibition voltage, between the first timing and fourth timing that is equal to or later than the second timing and that is earlier than the third timing; and maintaining the respective connections of the first bit line and the third bit line, disconnecting the connection of the second bit line and supplying the second bit line with a second permission voltage having a level between a level of the prohibition voltage and a level of the first permission voltage, between the fourth timing and the third timing.

According to an embodiment of the present disclosure, a memory device may include: a memory cell array coupled to word lines and bit lines; and a control circuit configured to perform a program operation on the array by: performing a bit line setup operation during a time section A, performing a program pulse application operation during a time section B, applying, to a first bit line of the bit lines, the first permission voltage during a time section C and a second permission voltage during a time section D, and applying, respectively to second and third bit lines of the bit lines, a first permission voltage and a prohibition voltage during the time sections C and D. Memory cells coupled to the first and second bit lines may have different program states and a memory cell coupled to the third bit line may have a program prohibition state. The time section A may be defined by first and second time points. The time section B may be defined by the second time point and a third time point. The time section C may be defined by the first time point and a fourth time point, which is between the second and third time points. The time section D may be defined by the fourth and third time points. The second permission voltage may have a level between the prohibition voltage and the first permission voltage.

This technology can stably maintain the potential levels of bit lines in a bit line setup interval and a program pulse application interval that are included in a program operation by preventing the floating of a bit line from occurring in the bit line setup interval and the program pulse application interval.

Accordingly, data can be stably stored in the program operation.

BRIEF DESCRIPTION OF THE DRAWINGS

FIG. 1 is a diagram for describing a method of controlling a program operation of a memory device according to an embodiment of the present disclosure.

FIG. 6 is a diagram for describing a setting operation of a latch that is included in the page buffer according to an embodiment of the present disclosure, which is disclosed in FIGS. 4A and 4B and FIGS. 5A and 5B.

DETAILED DESCRIPTION

Figure 2A:
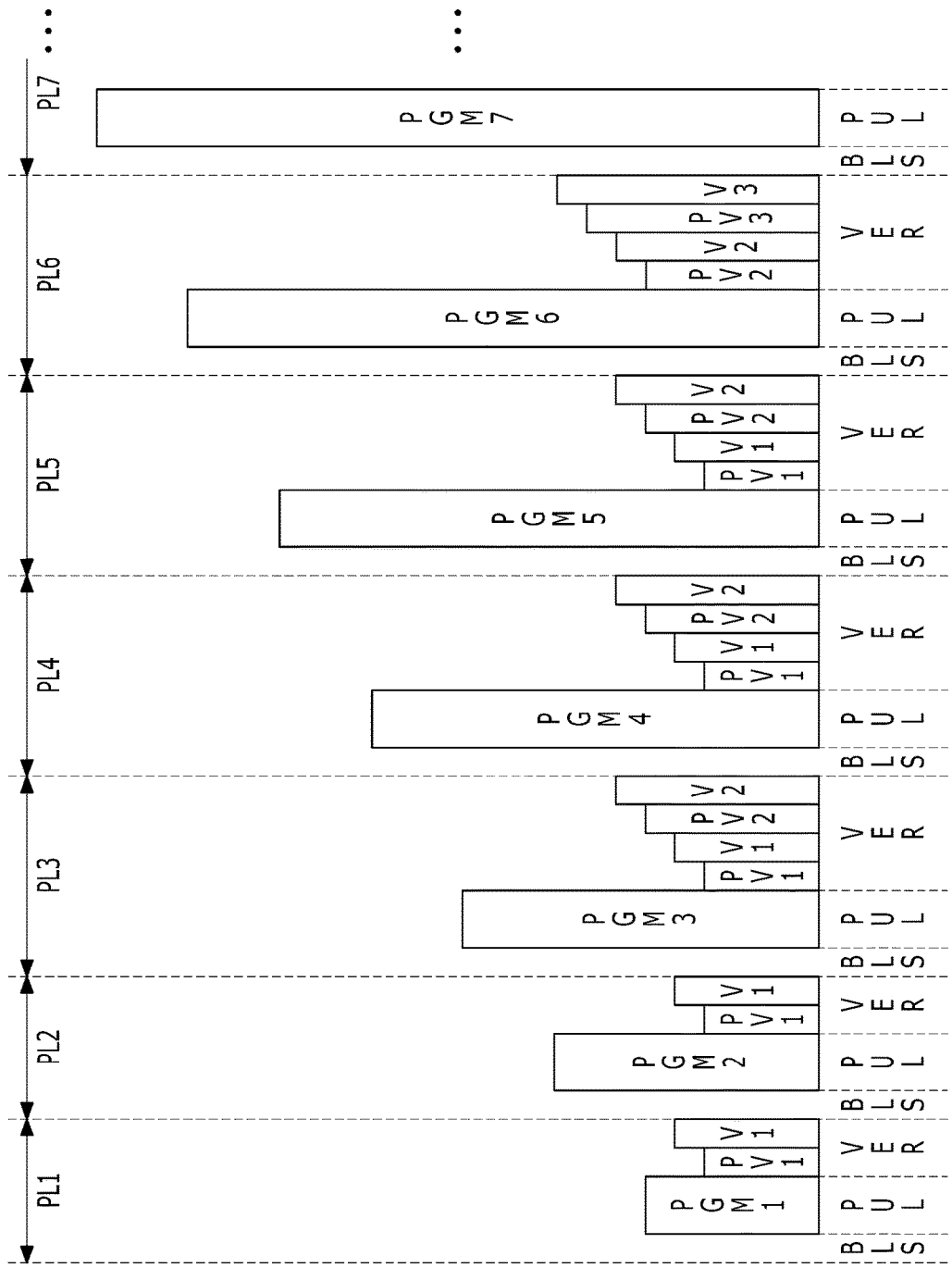
FIGS. 2A and 2B are diagrams for describing a program operation using a double verify PGM (DPGM) method.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram for describing a method of controlling a program operation of a memory device according to an embodiment of the present disclosure.

Figure 2B:
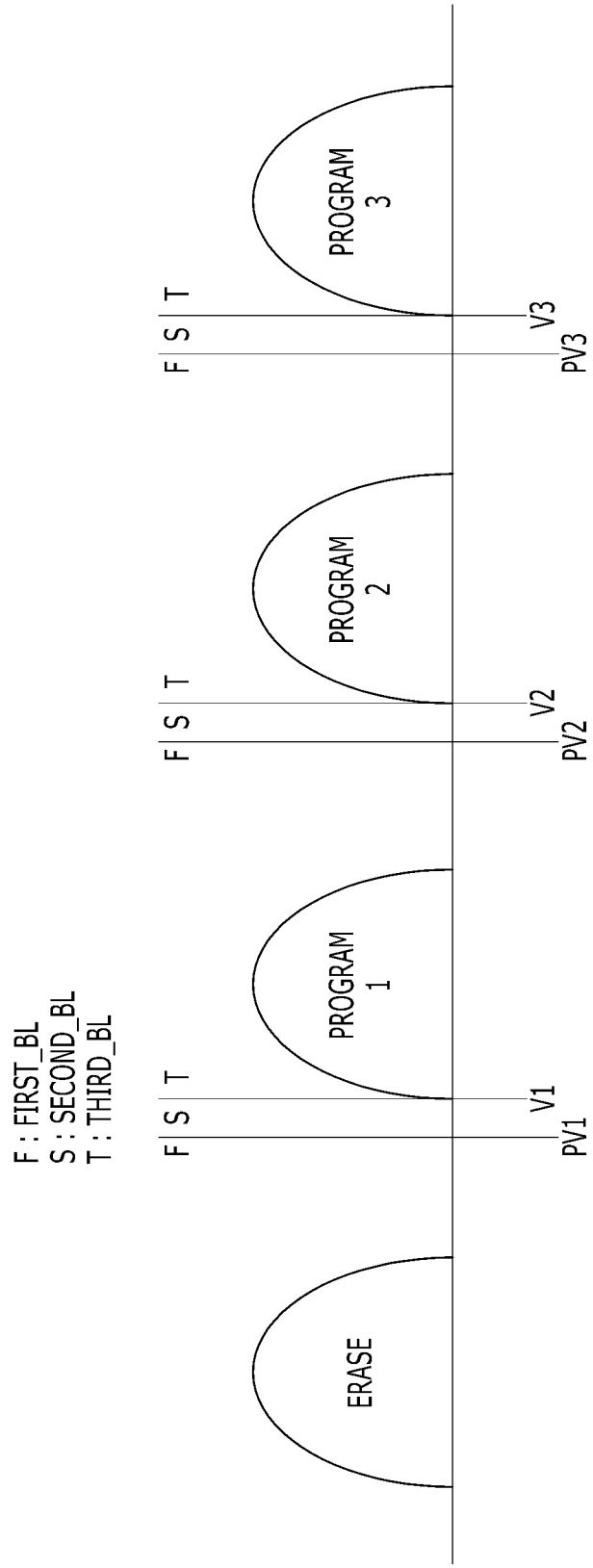

FIGS. 2A and 2B are diagrams for describing a program operation using a DPGM method.

Referring to FIG. 1, a memory device 150 according to an embodiment of the present disclosure may include a memory cell array 201 and a controller 202.

In this case, the memory device 150 may include multiple memory cells (MEMORY CELL) that are connected between multiple word lines (WL<1:n>) and multiple bit lines (BL<1:m>).

The controller 202 may perform a program operation on a selected region of the memory cell array 201. That is, the controller 202 may program a memory cell that has been selected as a program target so that the memory cell has one of multiple program states.

In an embodiment, the memory cells included in the memory cell array 201 may be configured as single level cells (SLCs) each storing 1-bit data, multi-level cells (MLCs) each storing 2-bit data, triple level cells (TLCs) each storing 3-bit data or quad level cells (QLCs) each storing 4-bit data.

In an embodiment, the program state of a single level cell (SLC) in which one data bit is stored may be divided into two program states on the basis of one threshold voltage level. The program state of a multi-level cell (MLC) in which two data bits are stored may be divided into four program states on the basis of three threshold voltage levels. The program state of a triple level cell (TLC) in which three data bits are stored may be divided into eight program states on the basis of seven threshold voltage levels. The program state of a quad level cell (QLC) in which four data bits are stored may be divided into sixteen program states on the basis of fifteen threshold voltage levels. Hereinafter, each of the multiple memory cells that are included in the memory cell array 201 is a multi-level cell, for convenience of description.

Referring to FIG. 1 together with FIG. 2A, the program operation may include multiple program loops PL1 to PL7. That is, the controller 202 may program a memory cell that has been selected as a program target so that the memory cell has one of multiple program states by repeatedly performing the multiple program loops PL1 to PL7 one by one in a set order until the program operation is completed. Furthermore, the controller 202 may determine the program operation to be a fail if the program operation is not successful within the preset number of program loops.

In this case, each of the multiple program loops PL1 to PL7 may include a bit line setup interval BLS in which the potential level of each of the bit lines BL1 to BLm is set based on a program state of each of cells (hereinafter referred to as "program-target cells") connected to a word line (hereinafter referred to as a "program-target word line") that has been selected as a program target, a program pulse application interval PUL in which the threshold voltage levels of the program-target cells are changed by applying the program pulses PGM<1:7> to the program-target word line, and a verification interval VER in which program states of cells (hereinafter referred to as "verify-target cells") that have been selected as a verification target, among the program-target cells, are verified by applying, to the program-target word line, a verification voltage corresponding to a target level and a pre-verification voltage having a pre-target level lower than the target level.

The potential level of the program voltage may be increased whenever each of the multiple program loops PL1 to PL7 is performed. That is, in the program operation, the level of the program voltage may be increased according to an increment step pulse program (ISPP) method as each of the multiple program loops PL1 to PL7 is repeatedly performed. The number of program voltages applied, a voltage level, and a voltage application time, which are used in each of the multiple program loops PL1 to PL7, may be determined in various forms.

Furthermore, the controller 202 may apply pre-verification voltages PV1, PV2, and PV3 and verification voltages V1, V2, and V3 to the program-target word line in the verification interval VER that is included in each of the multiple program loops PL1 to PL7. That is, the controller 202 may use a double verify PGM (DPGM) method using two verification voltages PV1 and V1, PV2 and V2, or PV3 and V3 in order to identify one program state in the verification interval VER. The controller 202 may detect a voltage or current that is output through a bit line to which each of the verify-target cells is connected, and may determine whether each of the verify-target cells is a program pass or fail based on a result of the detection, in the verification interval VER.

In order to describe the DPGM method, reference is made to both FIGS. 2A and 2B along with FIG. 1. After the start of a program operation, the controller 202 may target one of the four program states, that is, one of an erase state ERASE and first to third program states PROGRAM1, PROGRAM2, and PROGRAM3, as the state of each of the program-target cells. That is, after the start of a program operation, the controller 202 may program the program-target cells so that each of the program-target cells has one of the erase state ERASE and the first to third program states PROGRAM1, PROGRAM2, and PROGRAM3 by repeatedly performing the multiple program loops PL1 to PL7 in a set order.

The controller 202 may perform a program verification operation for at least one of the erase state ERASE and the first to third program states PROGRAM1, PROGRAM2, and PROGRAM3 in the verification interval VER. For example, in order to distinguish between the first to third program states PROGRAM1, PROGRAM2, and PROGRAM3 for the verify-target cells, the three verification voltages V1, V2, and V3 corresponding to three threshold voltage levels, that is, target levels, and the three pre-verification voltages PV1, PV2, and PV3 corresponding to pre-target levels each lower than the target level, may be applied to the program-target word line. That is, the controller 202 may identify that the threshold voltage level of each of the verify-target cells is in the state in which the threshold voltage level is adjacent to each of the first to third program states PROGRAM1, PROGRAM2, and PROGRAM3 by applying, to the program-target word line, each of the three pre-verification voltages PV1, PV2, and PV3 having the pre-target levels each lower than the target level in the verification interval VER. Furthermore, the controller 202 may identify that the threshold voltage level of each of the verify-target cells is in the state in which the threshold voltage level has reached each of the first to third program states PROGRAM1, PROGRAM2, and PROGRAM3 by applying, to the program-target word line, each of the three verification voltages V1, V2, and V3 having the target levels in the verification interval VER.

In this case, verification operations of cells having different target levels, among the verify-target cells, may be classified. For example, in the case of cells each having the first program state PROGRAM1 as a target, among the verify-target cells, that is, in the case of cells the threshold voltage level of each of which is compared with the level of the first pre-verification voltage PV1 and the level of the first verification voltage V1, among the verify-target cells, the threshold voltage level of each of the cells may not be compared with the level of the second pre-verification voltage PV2 and the level of the second verification voltage V2, and with the level of the third pre-verification voltage PV3 and the level of the third verification voltage V3. Furthermore, in the case of cells having the second program state PROGRAM2 as a target, among the verify-target cells, that is, in the case of cells the threshold voltage level of each of which is compared with the level of the second pre-verification voltage PV2 and the level of the second verification voltage V2, among the verify-target cells, the threshold voltage level of each of the cells may not be compared with the level of the first pre-verification voltage PV1 and the level of the first verification voltage V1, and with the level of the third pre-verification voltage PV3 and the level of the third verification voltage V3. Furthermore, in the case of cells having the third program state PROGRAM3 as a target, among the verify-target cells, that is, in the case of cells the threshold voltage level of each of which is compared with the level of the third pre-verification voltage PV3 and the level of the third verification voltage V3, among the verify-target cells, the threshold voltage level of each of the cells may not be compared with the level of the first pre-verification voltage PV1 and the level of the first verification voltage V1, and with the level of the second pre-verification voltage PV2 and the level of the second verification voltage V2.

For reference, the level of the first verification voltage V1 for identifying the first program state PROGRAM1 may be lower than the level of the second pre-verification voltage PV2 for identifying the second program state PROGRAM2. Furthermore, the level of the second verification voltage V2 for identifying the second program state PROGRAM2 may be lower than the level of the third pre-verification voltage PV3 for identifying the third program state PROGRAM3.

The controller 202 may classify each of the bit lines BL1 to BLm, corresponding to the program-target cells, as each of first to third bit lines FIRST_BL, SECOND_BL, and THIRD_BL based on a program state of each of the program-target cells that have been verified in the verification interval VER (S10).

Specifically, in the case of program-target cells each having the first program state PROGRAM1 as a target, among the bit lines BL1 to BLm corresponding to the program-target cells, a bit line connected to program-target cells each having a threshold voltage level lower than the level of the first pre-verification voltage PV1 may be classified as a first bit line FIRST_BL. A bit line connected to program-target cells each having a threshold voltage level that is higher than the level of the first pre-verification voltage PV1 and that is lower than the level of the first verification voltage V1 may be classified as a second bit line SECOND_BL. A bit line connected to program-target cells each having a threshold voltage level higher than the level of the first verification voltage V1 may be classified as a third bit line THIRD_BL.

Furthermore, in the case of program-target cells each having the second program state PROGRAM2 as a target, among the bit lines BL1 to BLm corresponding to the program-target cells, a bit line connected to program-target cells each having a threshold voltage level lower than the level of the second pre-verification voltage PV2 may be classified as the first bit line FIRST_BL. A bit line connected to program-target cells each having a threshold voltage level that is higher than the level of the second pre-verification voltage PV2 and that is lower than the level of the second verification voltage V2 may be classified as the second bit line SECOND_BL. A bit line connected to the program-target cells each having a threshold voltage level higher than the level of the second verification voltage V2 may be classified as the third bit line THIRD_BL.

Furthermore, in the case of program-target cells each having the third program state PROGRAM3 as a target, among the bit lines BL1 to BLm corresponding to the program-target cells, a bit line connected to program-target cells each having a threshold voltage level lower than the third pre-verification voltage PV3 may be classified as the first bit line FIRST_BL. A bit line connected to program-target cells each having a threshold voltage level that is higher than the level of the third pre-verification voltage PV3 and that is lower than the level of the third verification voltage V3 may be classified as the second bit line SECOND_BL. A bit line connected to program-target cells each having a threshold voltage level higher than the level of the third verification voltage V3 may be classified as the third bit line THIRD_BL.

In the case of the memory cells that are connected to the first bit line FIRST_BL, a program operation may need to be rapidly performed on the memory cells in order for the threshold voltage levels of the memory cells to reach the first to third program states PROGRAM1, PROGRAM2, and PROGRAM3, that is, target program states.

In the case of the memory cells that are connected to the second bit line SECOND_BL, a program operation may need to be slowly performed on the memory cells, compared to the memory cells that are connected to the first bit line FIRST_BL, in order for the threshold voltage levels of the memory cells to reach the first to third program states PROGRAM1, PROGRAM2, and PROGRAM3, that is, target program states.

In the case of the memory cells that are connected to the third bit line THIRD_BL, a program operation may need to be prohibited because the threshold voltage levels of the memory cells have reached the first to third program states PROGRAM1, PROGRAM2, and PROGRAM3, that is, the target program states, and the memory cells are in the state in which a program has been completed.

Accordingly, a program operation having higher program strength than a program operation that is performed on the memory cells that are connected to the second bit line SECOND_BL may be performed on the program-target cells that are connected to the first bit line FIRST_BL. The program strength may be determined by the time that is taken for a program pulse to be applied, the number of program pulses applied, and a potential difference between program pulses. To this end, after the potential levels of the first to third bit lines FIRST_BL, SECOND_BL, and THIRD_BL are differently set in the bit line setup interval BLS, the program pulse application interval PUL may be entered.

According to embodiments, in the first program loop PL1, among the multiple program loops PL1 to PL7, only the first pre-verification voltage PV1 and the first verification voltage V1 for identifying the first program state PROGRAM1 may be used in the verification interval. In such a case, all bit lines that are connected to memory cells having the second and third program states PROGRAM2 and PROGRAM3 as a target program state may be classified as the first bit line FIRST_BL. That is, all of the memory cells having the second and third program states PROGRAM2 and PROGRAM3 as a target program state may be rapidly programmed.

According to embodiments, the threshold voltage levels of all memory cells each having the first program state PROGRAM1, among the multiple program loops PL1 to PL7, as a target program state may reach the first program state through the first to third program loops PL1 to PL5. Accordingly, from the subsequent sixth program loop PL6, in the verification interval, the first pre-verification voltage PV1 and the first verification voltage V1 may not be used, and only the second and third pre-verification voltages PV2 and PV3 and the second and third verification voltages V2 and V3 for identifying the second and third program states PROGRAM2 and PROGRAM3 may be used. In such a case, all bit lines that are connected to memory cells each having the first program state PROGRAM1 as a target program state may be classified as the third bit line THIRD_BL. That is, the memory cells each having the first program state PROGRAM1 as the target program state may be no longer programmed.

In the bit line setup interval BLS, after a first permission voltage is applied to the first bit line FIRST_BL, a second permission voltage having a level that is higher than the level of the first permission voltage and that is lower than the level of a prohibition voltage is applied to the second bit line SECOND_BL, and a prohibition voltage is applied to the third bit line THIRD_BL, the program pulse application interval PUL may be entered.

Accordingly, the threshold voltage level of the memory cell connected to the first bit line FIRST_BL may have a potential difference between the potential level of a program pulse and the level of the first permission voltage in the program pulse application interval PUL. Furthermore, the threshold voltage level of the memory cell connected to the second bit line SECOND_BL may have a potential difference between the potential level of the program pulse and the level of the second permission voltage in the program pulse application interval PUL. Furthermore, the threshold voltage level of the memory cell connected to the third bit line THIRD_BL may have a potential difference between the potential level of the program pulse and the level of the prohibition voltage in the program pulse application interval PUL. Accordingly, the program strength for the memory cell connected to the first bit line FIRST_BL may be higher than the program strength for the memory cell connected to the second bit line SECOND_BL. In this case, the memory cell connected to the third bit line THIRD_BL may not be programmed.

In particular, the controller 202 according to an embodiment of the present disclosure may connect each of the first bit line FIRST_BL and the second bit line SECOND_BL to a node of the first permission voltage, in a first interval that is equal to or longer than the bit line setup interval BLS (S20).

Furthermore, the controller 202 may maintain the connection between the first bit line FIRST_BL and the node of the first permission voltage, in a second interval that is equal to or shorter than the program pulse application interval PUL and subsequent to the first interval (S40). That is, after connecting the first bit line FIRST_BL to the node of the first permission voltage in the first interval, the controller 202 may continuously maintain the state in which the first bit line FIRST_BL and the node of the first permission voltage have been connected to each other, up to the second interval subsequent to the first interval. Accordingly, the first bit line FIRST_BL can stably maintain the level of the first permission voltage in the first interval and the second interval.

Furthermore, in the second interval, the controller 202 may disconnect the second bit line SECOND_BL from the node of the first permission voltage and apply the second permission voltage to the second bit line SECOND_BL (S50). That is, the controller 202 may connect the second bit line SECOND_BL to the node of the first permission voltage in the first interval, but may disconnect the connection between the second bit line SECOND_BL and the node of the first permission voltage and instead apply the second permission voltage to the second bit line SECOND_BL in the second interval subsequent to the first interval. Accordingly, the second bit line SECOND_BL can stably maintain the level of the first permission voltage in the first interval, and can stably maintain the level of the second permission voltage in the second interval subsequent to the first interval.

Furthermore, the controller 202 may connect the third bit line THIRD_BL to a node of the prohibition voltage in the first interval and the second interval (S30). Accordingly, the third bit line THIRD_BL can stably maintain the level of the prohibition voltage in the first interval and the second interval.

According to embodiments, the first permission voltage may have the level of a ground voltage VSS or the level of a negative voltage, which is lower than the level of the ground voltage VSS. The second permission voltage may have a level higher than the level of the ground voltage VSS, for example, a level of 0.5 V. The prohibition voltage may have the level of the power supply voltage VCORE, for example, a level of 1.8 V.

Hereinafter, when the first permission voltage is the ground voltage VSS and the prohibition voltage is the power supply voltage VCORE, the second permission voltage is a voltage VDPGM that has been set to have a level disposed between the level of the ground voltage VSS and the level of the power supply voltage VCORE.

Figure 3:
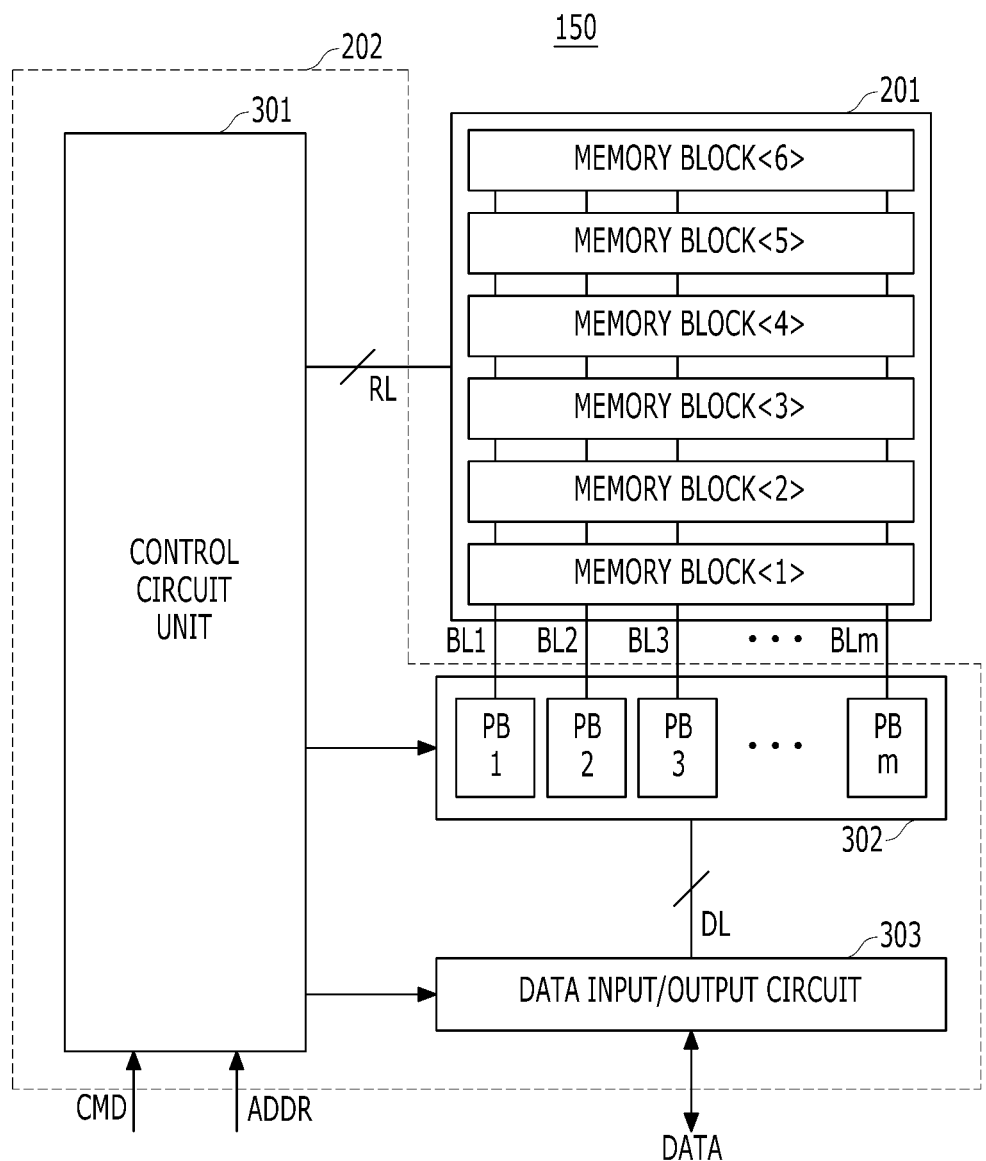
FIG. 3 is a diagram for describing a detailed construction of the memory device according to an embodiment of the present disclosure.

FIG. 3 is a diagram for describing a detailed construction of the memory device according to an embodiment of the present disclosure.

Referring to FIG. 3, the memory device 150 may include the memory cell array 201 and the controller 202. The controller 202 may include a control circuit unit 301, a page buffer unit 302, and a data input/output circuit 303.

The memory cell array 201 may include a plurality of memory blocks MEMORY BLOCK<1:6>. The plurality of memory blocks MEMORY BLOCK<1:6> may be connected to the control circuit unit 301 through a row line RL. The plurality of memory blocks MEMORY BLOCK<1:6> may be connected to the page buffer unit 302 through bit lines BL1 to BLm. Each of the memory blocks MEMORY BLOCK<1:6> may include a plurality of memory cells. In an embodiment, the plurality of memory cells may be nonvolatile memory cells. Memory cells connected to the same word line may be defined as one page. Accordingly, one memory block may include a plurality of pages. The row line RL may include at least one source selection line, a plurality of word lines WL<1:n> and at least one drain selection line.

The control operation unit 304 may be configured to control an overall operation of the memory device 150. The control circuit unit 301 may be configured to perform a program, read or erase operation on a selected region of the memory cell array 201. The control operation unit 304 may operate in response to a command CMD and an address ADDR that is transmitted by an external device.

For example, the control circuit unit 301 may control the memory cell array 201, the page buffer unit 302, and the data input/output circuit 303 by generating various signals in response to the command CMD and an address ADDR.

The control circuit unit 301 may drive the memory cell array 201. For example, the control circuit unit 301 may apply various operating voltages to the row line RL and the bit lines BL1 to BLm, or discharge the applied voltages.

The control circuit unit 301 may be connected to the memory cell array 201 through the row line RL. The row line RL may include the drain selection line, the word lines, the source selection line and a common source line.

The control circuit unit 301 may be configured to decode a block address of the received address RADD. The control circuit unit 301 may select at least one memory block among the memory blocks MEMORY BLOCK<1:6> according to the decoded block address. The control circuit unit 301 may be configured to decode a row address of the received address RADD. The control circuit unit 301 may select at least one word line among word lines of the selected memory block according to the decoded row address. The control circuit unit 301 may apply operating voltages to the selected word line.

The program operation of the memory device 150 may be performed in units of pages. During the program pulse application interval PUL (refer to FIG. 2A) that is included in the program operation, the control circuit 301 may apply a program voltage to the selected word line, and apply a pass voltage having a lower level than the program voltage to an unselected word line. In this case, the control circuit unit 301 may classify each of the bit lines BL1 to BLm corresponding to the program-target cells into one of the first to third bit lines FIRST_BL, SECOND_BL, and THIRD_BL (refer to FIG. 2B), based on a program state of each of the program-target cells that have been verified in the verification interval VER (refer to FIG. 2A) included in the program operation. Furthermore, the control circuit unit 301 may differently set the potential level of each of the first to third bit lines FIRST_BL, SECOND_BL, and THIRD_BL in the bit line setup interval BLS (refer to FIG. 2A) that is included in the program operation, and may then enter the program pulse application interval PUL. In particular, the control circuit unit 301 may connect each of the first bit line FIRST_BL and the second bit line SECOND_BL to the node of the first permission voltage, in the first interval that is equal to or longer than the bit line setup interval BLS. Furthermore, the control circuit unit 301 may maintain the connection between the first bit line FIRST_BL and the node of the first permission voltage, in the second interval that is equal to or shorter than the program pulse application interval PUL and subsequent to the first interval. Furthermore, the control circuit unit 301 may disconnect the second bit line SECOND_BL from the node of the first permission voltage and apply the second permission voltage to the second bit line SECOND_BL in the second interval. Furthermore, the control circuit unit 301 may connect the third bit line THIRD_BL to the node of the prohibition voltage in the first interval and the second interval. According to embodiments, the first permission voltage may have the level of a negative voltage that is lower than the level of the ground voltage VSS or may have the level of the ground voltage VSS. The second permission voltage may have a level higher than the level of the ground voltage VSS, for example, a level of 0.5 V. The prohibition voltage may have the level of the power supply voltage VCORE, for example, a level of 1.8 V.

The read operation of memory device 150 may be performed in units of pages. During the read operation, the control circuit 301 may apply a read voltage to the selected word line, and apply a read pass voltage having a higher level than the read voltage to the unselected word line.

The erase operation of the memory device 150 may be performed in units of memory blocks. During the erase operation, an address ADDR inputted to the memory device 150 during the erase operation may include a block address. The control circuit 301 may decode the block address, and select at least one memory block according to the decoded block address. During the erase operation, the control circuit 301 may apply a ground voltage to a word line of the selected memory block.

The control circuit unit 301 may be configured to generate a plurality of operating voltages by using an external power supply voltage. The control circuit unit 301 may operate in response to the control of the control operation unit 304. In an embodiment, the control circuit unit 301 may regulate the external power supply voltage, and generate an internal power supply voltage. In an embodiment, the control circuit unit 301 may generate the plurality of operating voltages by using the external power supply voltage or the internal power supply voltage. For example, the control circuit unit 301 may generate a plurality of erase voltages, a plurality of program voltages, a plurality of pass voltages, a plurality of selective read voltages and a plurality of unselective read voltages.

The control circuit unit 301 may include a plurality of pumping capacitors, which receive the internal power supply voltage, to generate the plurality of operating voltages having various voltage levels, and generate the plurality of operating voltages by selectively activating the plurality of pumping capacitors in response to the control of the control circuit unit 301. The generated operating voltages may be supplied to the memory cell array 201 by the control circuit unit 301.

The page buffer unit 302 may include a plurality of page buffers PB1 to PBm. The plurality of page buffers PB1 to PBm may be connected to the memory cell array 201 through the plurality of bit lines BL1 to BLm, respectively. The plurality of page buffers PB1 to PBm may operate in response to the control of the control circuit unit 301.

The plurality of page buffers PB1 to PBm may communicate data DATA with the data input/output circuit 303. During the program operation, the plurality of page buffers PB1 to PBm may receive the data DATA to be stored, through the data input/output circuit 303 and a data line DL.

When a program voltage is applied to a selected word line in the program pulse application interval that is included in the program operation, the multiple page buffers PB1 to PBm will transfer, to a selected memory cell, data DATA that is to be stored and that has been received through a data input/output circuit 303 through the bit lines BL1 to BLm. Memory cells of a selected page may be programmed based on the transferred data DATA. The threshold voltages of a memory cell connected to the first bit line FIRST_BL to which the first permission voltage is applied and a memory cell connected to the second bit line SECOND_BL to which the second permission voltage is applied may rise. The threshold voltage of a memory cell connected to the third bit line THIRD_BL to which the prohibition voltage is applied may be maintained without being changed.

During the read operation, the page buffer unit 302 may read the data DATA from the memory cell of the selected page through the bit lines BLs, and store the read data DATA in the plurality of page buffers PB1 to PBm. That is, in the read operation, the multiple page buffers PB1 to PBm may adjust the potential levels of the bit lines BL1 to BLm based on the threshold voltage level of a selected memory cell. Furthermore, in the read operation, the page buffer unit 302 may select some of the multiple bit lines, may read the data of a memory cell connected to a selected bit line, and may store the read data DATA in a page buffer connected to the selected bit line, among the multiple page buffers PB1 to PBm.

During the erase operation, the page buffer unit 302 may float the bit lines BLs. In an embodiment, the page buffer unit 302 may include a column selection circuit.

The control circuit unit 301 may be connected to the plurality of page buffers PB1 to PBm through the data line DL. The data input/output circuit 303 may operate in response to the control of the control circuit unit 301.

The data input/output circuit 303 may include a plurality of input/output buffers (not illustrated) that receive the data DATA inputted thereto. During the program operation, the data input/output circuit 303 may receive the data DATA to be stored from an external. The data input/output circuit 303 may output the data DATA, which is transmitted from the plurality of page buffers PB1 to PBm included in the page buffer unit 302, to the external during the read operation.

Figure 4A:
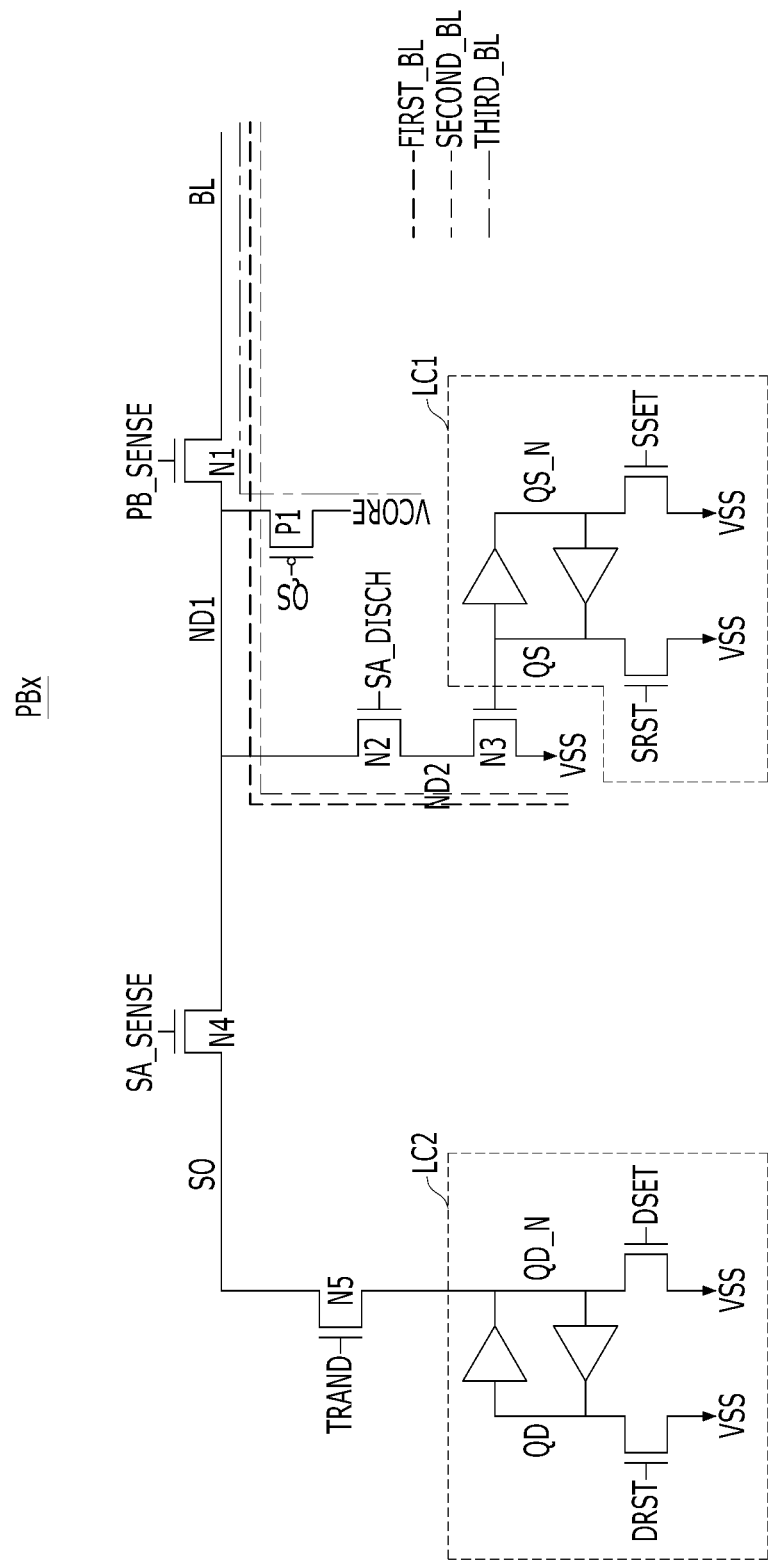
FIGS. 4A and 4B are diagrams for describing an example of a detailed construction and operation of a page buffer that is included in the memory device according to an embodiment of the present disclosure.
Figure 4B:
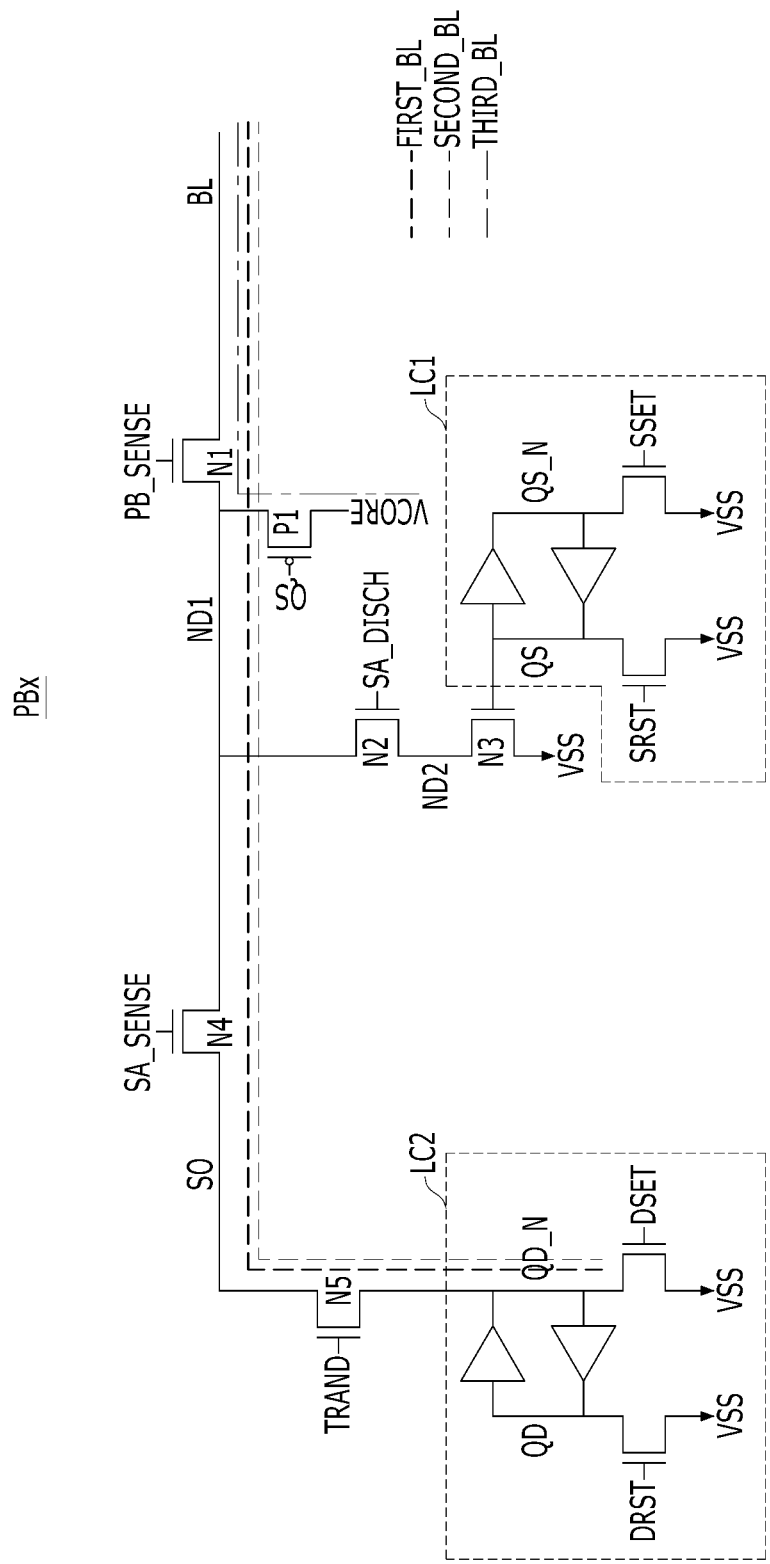

FIGS. 4A and 4B are diagrams for describing an example of a detailed construction and operation of a page buffer that is included in the memory device according to an embodiment of the present disclosure.

Figure 5A:
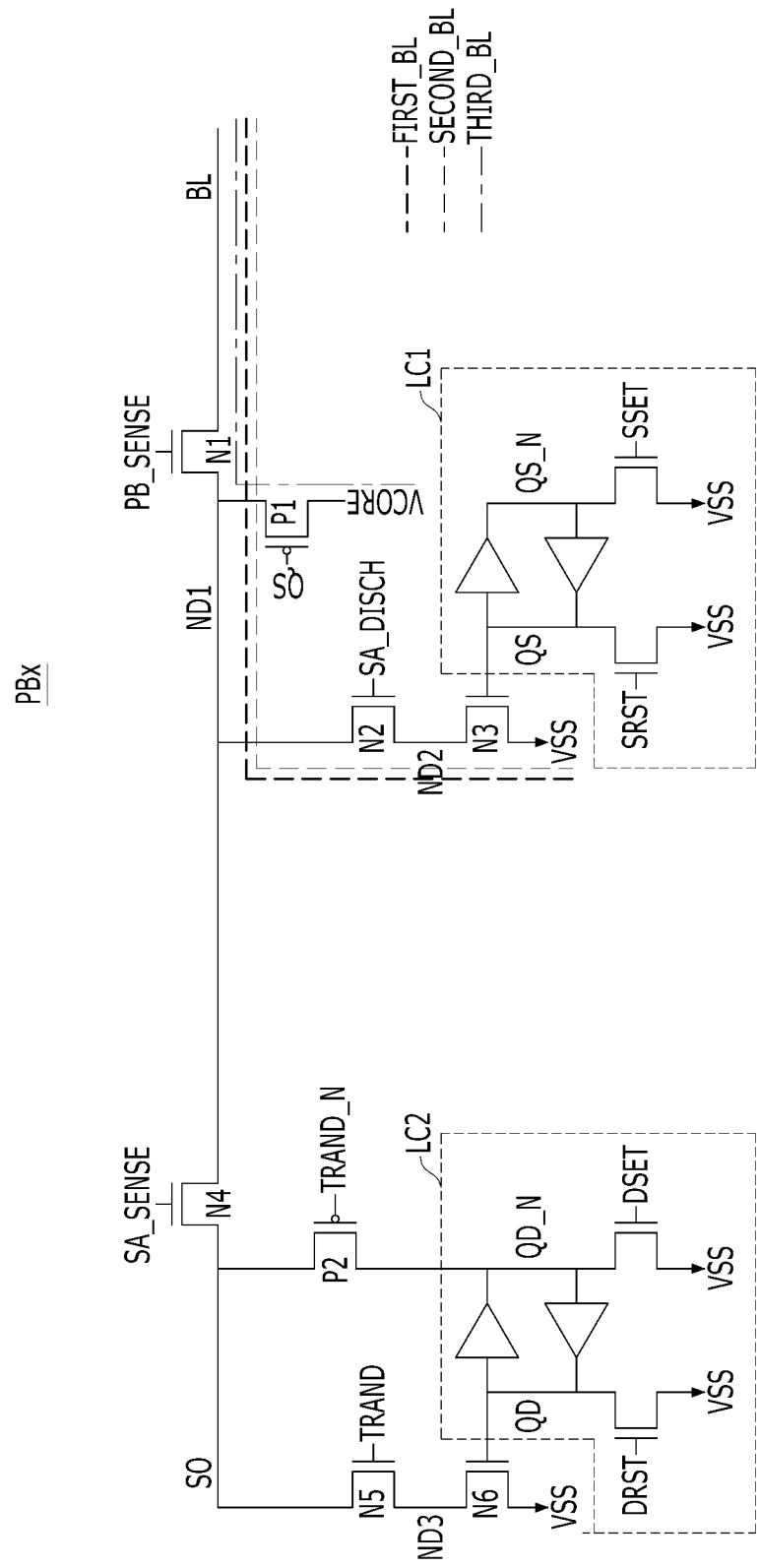
FIGS. 5A and 5B are diagrams for describing another example of a detailed construction and operation of a page buffer that is included in the memory device according to an embodiment of the present disclosure.
Figure 5B:
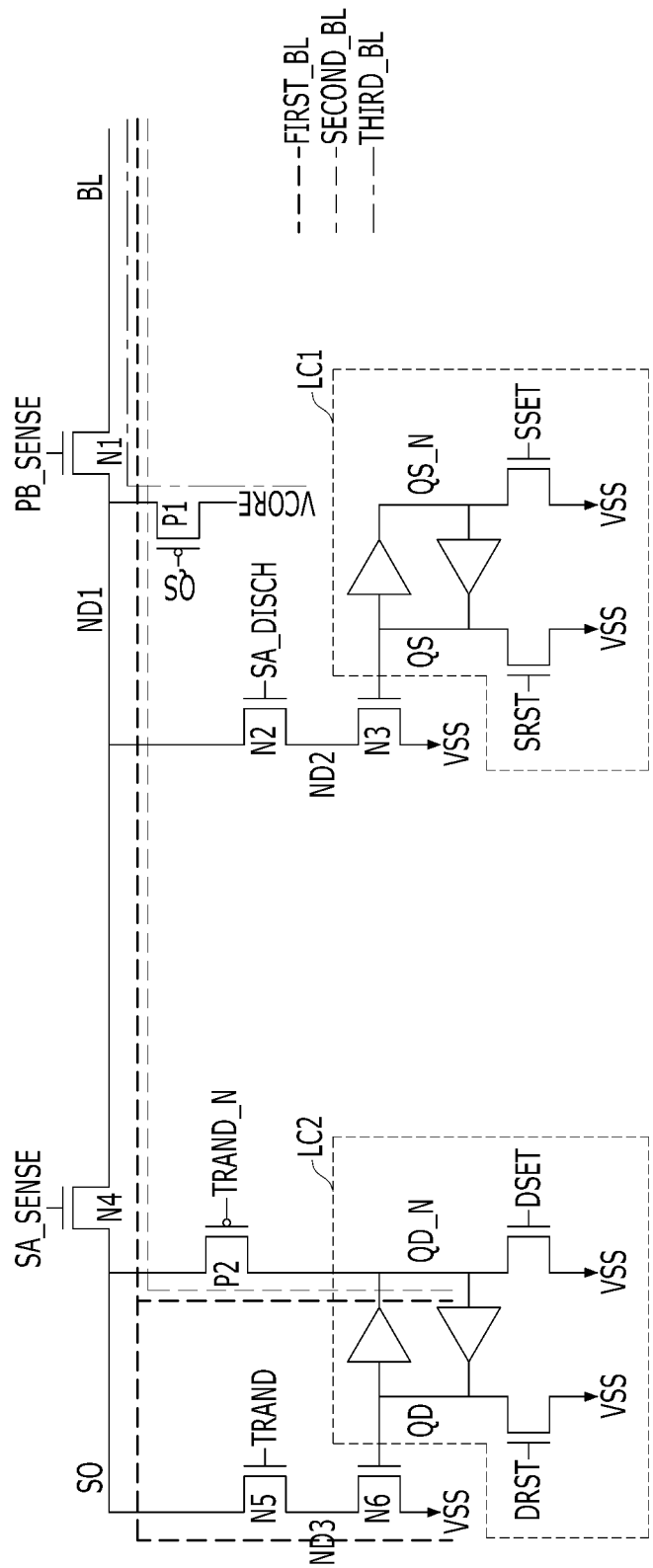

FIGS. 5A and 5B are diagrams for describing another example of a detailed construction and operation of a page buffer that is included in the memory device according to an embodiment of the present disclosure.

Figure 6:
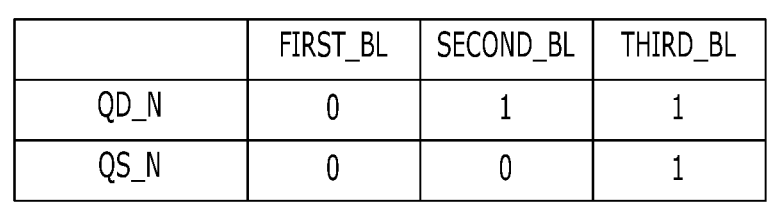

FIG. 6 is a diagram for describing a setting operation of a latch that is included in the page buffer according to an embodiment of the present disclosure, which is disclosed in FIGS. 4A and 4B and FIGS. 5A and 5B.

Figure 7A:
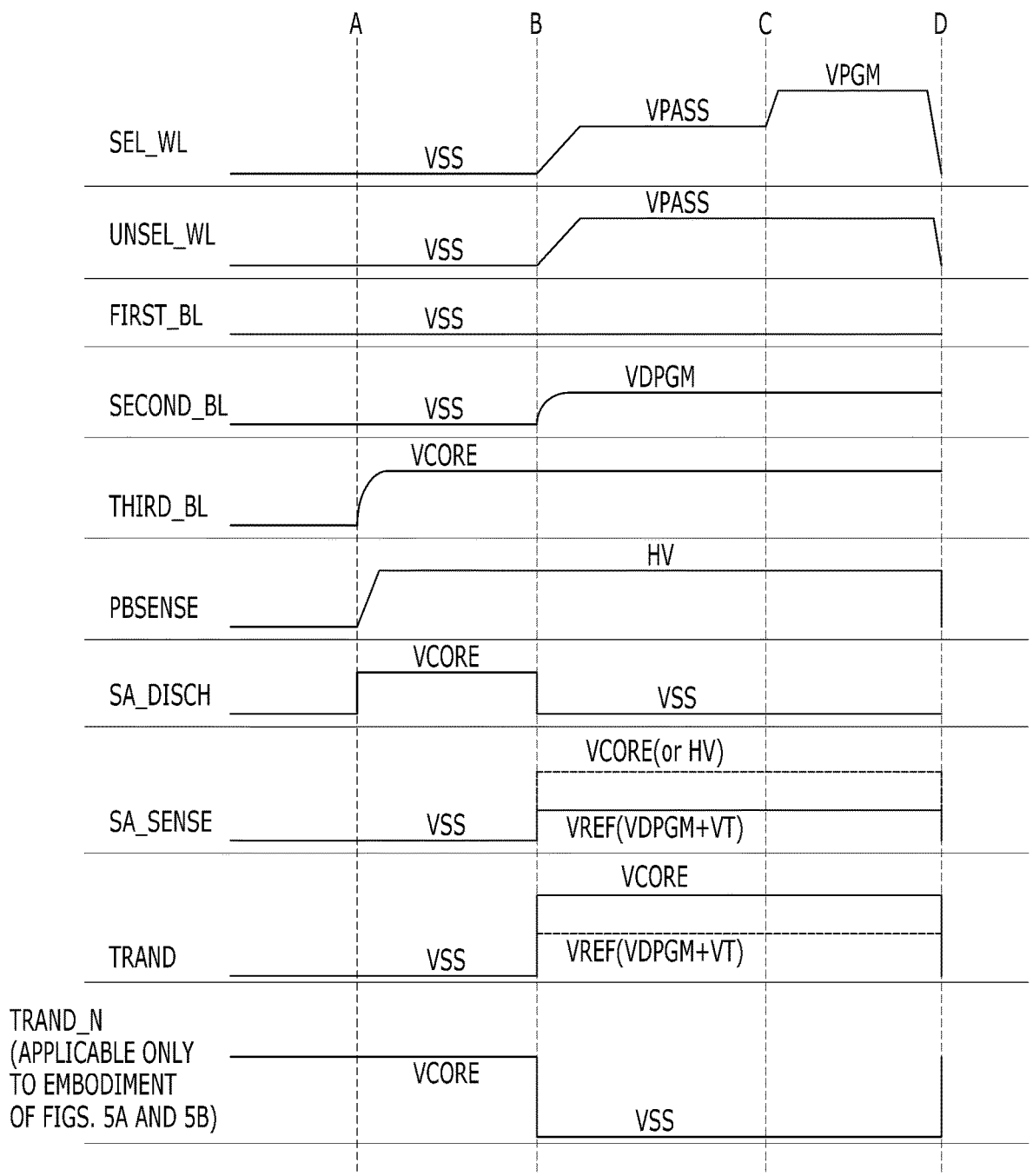
FIGS. 7A and 7B are timing diagrams for describing examples of a method of controlling the page buffer in a program operation according to an embodiment of the present disclosure.
Figure 7B:
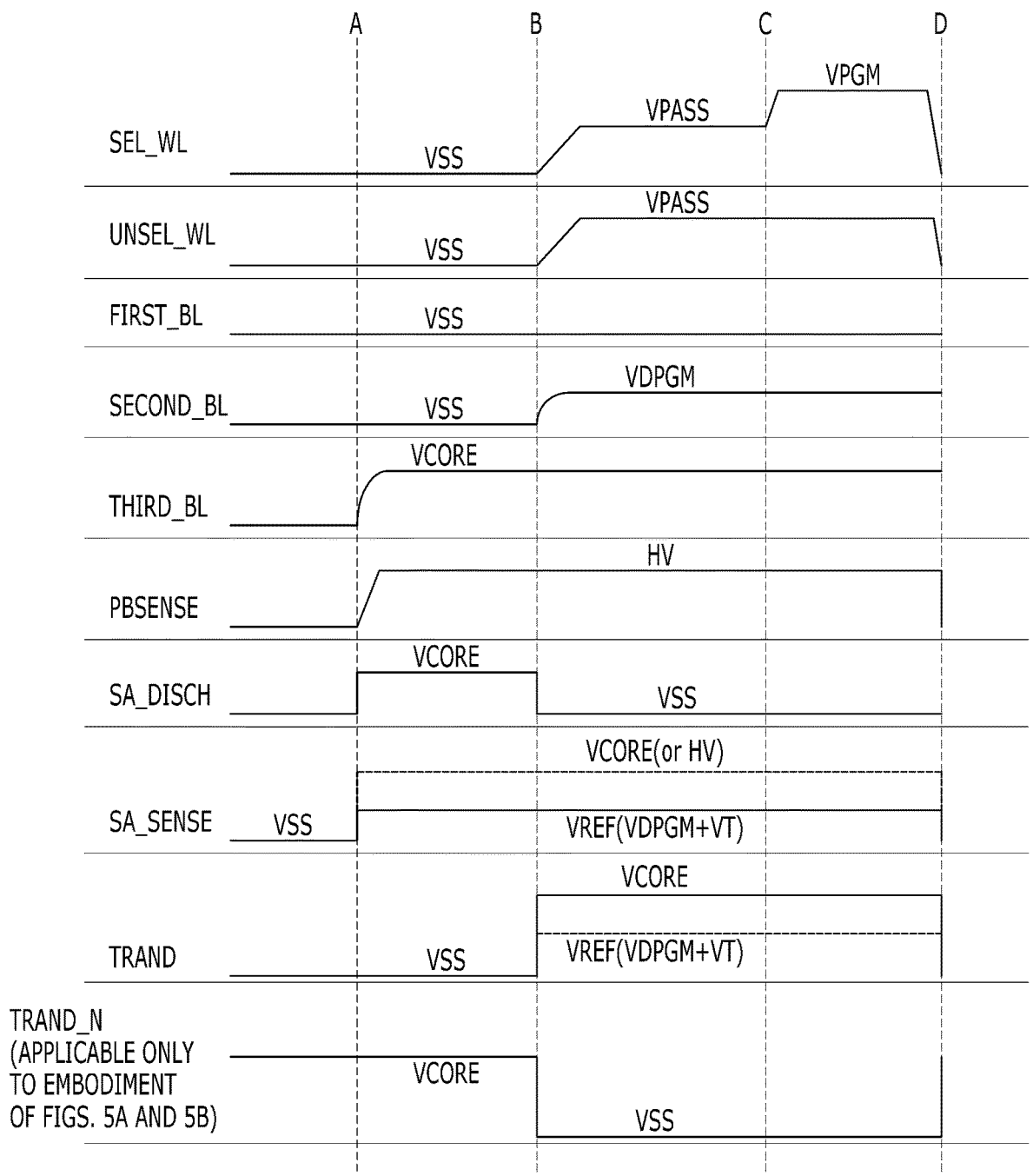

FIGS. 7A and 7B are timing diagrams for describing examples of a method of controlling the page buffer in a program operation according to an embodiment of the present disclosure.

Figure 8A:
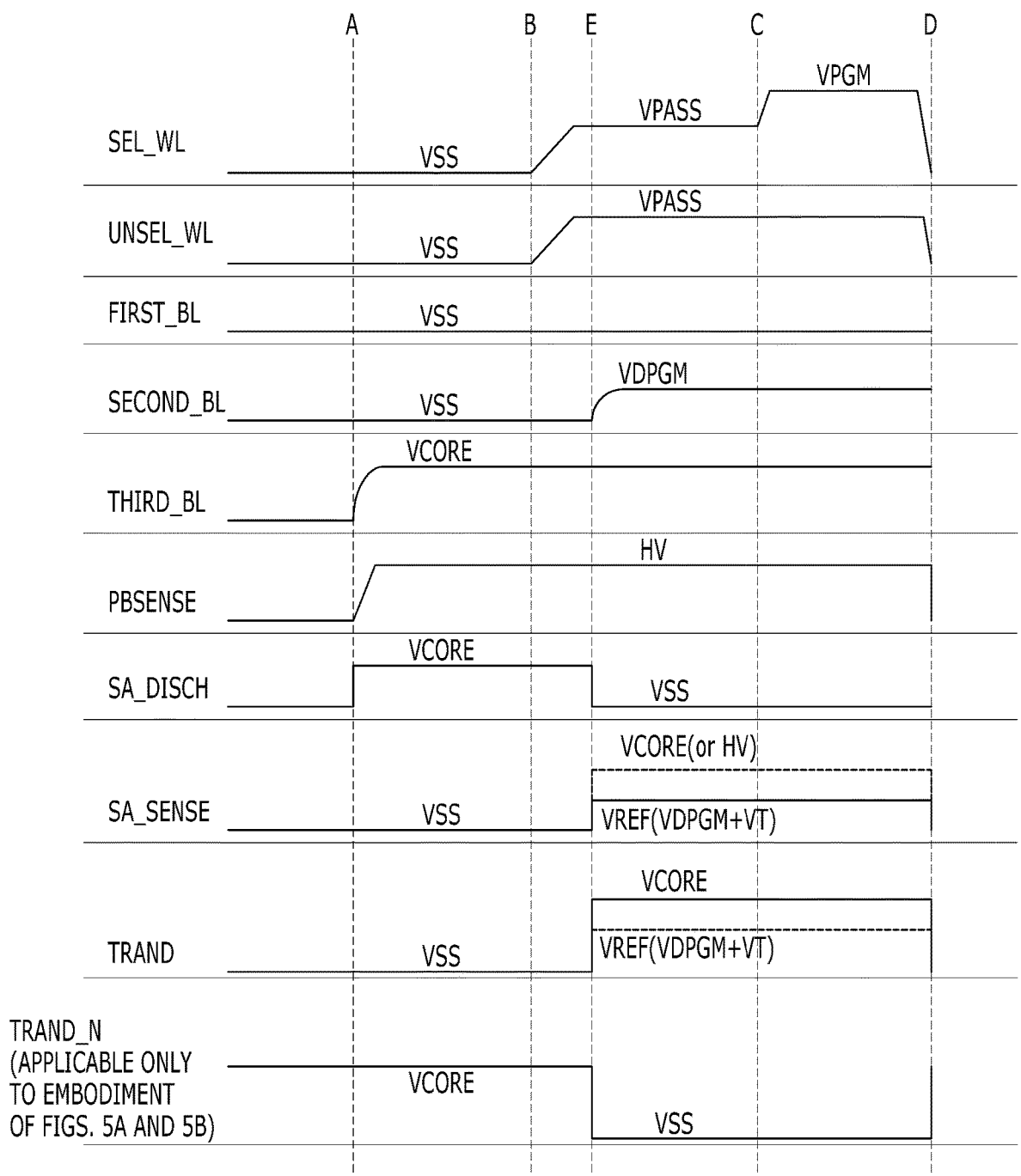
FIGS. 8A and 8B are timing diagrams for describing other examples of a method of controlling the page buffer in a program operation according to an embodiment of the present disclosure.
Figure 8B:
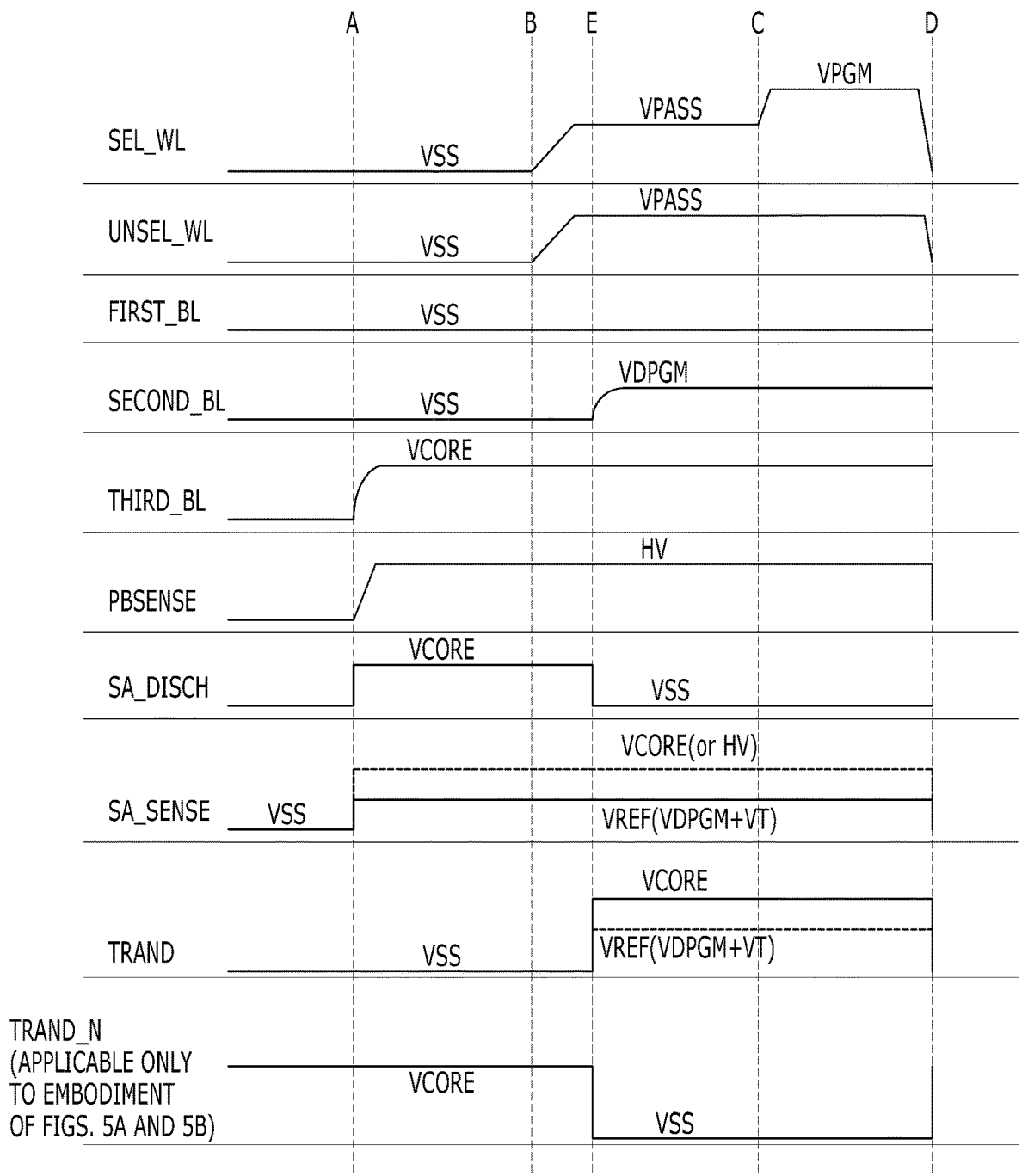

FIGS. 8A and 8B are timing diagrams for describing other examples of a method of controlling the page buffer in a program operation according to an embodiment of the present disclosure.

First, referring to both FIGS. 4A and 4B, it may be seen that an example of a detailed circuit construction of each page buffer PBx of the multiple page buffers PB1 to PBm that are included in the page buffer unit 302 illustrated in FIG. 3 is disclosed.

Furthermore, referring to both FIGS. 5A and 5B, it may be seen that another example of a detailed circuit construction of each page buffer PBx of the multiple page buffers PB1 to PBm that are included in the page buffer unit 302 illustrated in FIG. 3 is disclosed.

For reference, the circuit constructions of the page buffers disclosed in FIGS. 4A and 4B and FIGS. 5A and 5B are merely embodiments, and may actually have different forms.

Specifically, referring to both FIGS. 4A and 4B and FIGS. 5A and 5B, each page buffer PBx of the multiple page buffers PB1 to PBm may be connected between a bit line BL of the multiple bit lines BL1 to BLm and a sensing node SO.

Furthermore, each page buffer PBx of the multiple page buffers PB1 to PBm may include a first latch LC1 and a second latch LC2.

In this case, the value of a logic level that is stored in each of the first latch LC1 and the second latch LC2 may be adjusted under the control of the control circuit unit 301. That is, the control circuit unit 301 may adjust the value of the logic level that is stored in the first latch LC1 by properly adjusting the values of signals SSET and SRST for controlling an operation of the first latch LC1. Furthermore, the control circuit unit 301 may adjust the value of the logic level that is stored in the second latch LC2 by properly adjusting the values of signals DSET and DRST for controlling an operation of the second latch LC2.

Specifically, the control circuit unit 301 may differently set the value of a logic level that is stored in each of the first and second latches LC1 and LC2 that are included in a page buffer connected to the first bit line FIRST_BL, among the multiple page buffers PB1 to PBm, the value of a logic level that is stored in each of the first and second latches LC1 and LC2 that are included in a page buffer connected to the second bit line SECOND_BL, among the multiple page buffers PB1 to PBm, and the value of the logic level that is stored in each of the first and second latches LC1 and LC2 that are included in a page buffer connected to the third bit line THIRD_BL, among the multiple page buffers PB1 to PBm.

According to embodiments, referring to FIG. 6, in the case of the page buffer connected to the first bit line FIRST_BL, the control circuit unit 301 may set a negative node QS_N of the first latch LC1 to a logic level "0", and may set a negative node QD_N of the second latch LC2 to the logic level "0". That is, in the case of the page buffer connected to the first bit line FIRST_BL, the control circuit unit 301 may set the level of a positive node QS of the first latch LC1 as a logic level "1", and may set the level of a positive node QD of the second latch LC2 as the logic level "1".

Furthermore, in the case of the page buffer connected to the second bit line SECOND_BL, the control circuit unit 301 may set the negative node QS_N of the first latch LC1 to the logic level "0", and may set the negative node QD_N of the second latch LC2 to the logic level "1". That is, in the case of the page buffer connected to the second bit line SECOND_BL, the control circuit unit 301 may set the level of the positive node QS of the first latch LC1 as the logic level "1", and may set the level of the positive node QD of the second latch LC2 as the logic level "0".

Furthermore, in the case of the page buffer connected to the third bit line THIRD_BL, the control circuit unit 301 may set the negative node QS_N of the first latch LC1 to the logic level "1", and may set the negative node QD_N of the second latch LC2 to the logic level "1". That is, in the case of the page buffer connected to the third bit line THIRD_BL, the control circuit unit 301 may set the level of the positive node QS of the first latch LC1 as the logic level "0", and may set the level of the positive node QD of the second latch LC2 as the logic level "0".

In this case, a potential level corresponding to the logic level "0" may mean the level of the ground voltage VSS, that is, the level of the first permission voltage. A potential level corresponding to the logic level "1" may mean the level of the power supply voltage VCORE, that is, the level of the prohibition voltage.

Referring to FIGS. 4A and 4B, each page buffer PBx of the multiple page buffers PB1 to PBm may include first to fifth NMOS transistors N1, N2, N3, N4, and N5, and a first PMOS transistor P1 along with the first and second latches LC1 and LC2.

Specifically, the first NMOS transistor N1 may control the connection between a first middle node ND1 and a bit line BL of the multiple bit lines BL<1:m> in response to a first control signal PB_SENSE that is applied by the control circuit unit 301. The second NMOS transistor N2 may control the connection between the first middle node ND1 and a second middle node ND2, in response to a second control signal SA_DISCH that is applied by the control circuit unit 301. The first PMOS transistor P1 may control the connection between the first middle node ND1 and a node of a power supply voltage VCORE, in response to the potential level of the positive node QS of the first latch LC1. The third NMOS transistor N3 may control the connection between the second middle node ND2 and a node of the ground voltage VSS. The fourth NMOS transistor N4 may control the connection between the first middle node ND1 and the sensing node SO, in response to a third control signal SA_SENSE that is applied by the control circuit unit 301. The fifth NMOS transistor N5 may control the connection between the sensing node SO and the negative node QD_N of the second latch LC2, in response to a fourth control signal TRAND that is applied by the control circuit unit 301.

Referring to FIGS. 5A and 5B, each page buffer PBx of the multiple page buffers PB1 to PBm may include first to sixth NMOS transistors N1, N2, N3, N4, N5, and N6, and first and second PMOS transistors P1 and P2 along with the first and second latches LC1 and LC2.

Specifically, the first NMOS transistor N1 may control the connection between a first middle node ND1 and a bit line BL of the multiple bit lines BL<1:m> in response to a first control signal PB_SENSE that is applied by the control circuit unit 301. The second NMOS transistor N2 may control the connection between the first middle node ND1 and a second middle node ND2, in response to a second control signal SA_DISCH that is applied by the control circuit unit 301. The first PMOS transistor P1 may control the connection between the first middle node ND1 and the node of the power supply voltage VCORE, in response to the potential level of a positive node QS of the first latch LC1. The third NMOS transistor N3 may control the connection between the second middle node ND2 and the node of the ground voltage VSS. The fourth NMOS transistor N4 may control the connection between the first middle node ND1 and a sensing node SO, in response to a third control signal SA_SENSE that is applied by the control circuit unit 301. The fifth NMOS transistor N5 may control the connection between the sensing node SO and a third middle node ND3, in response to a fourth control signal TRAND that is applied by the control circuit unit 301. The sixth NMOS transistor N6 may control the connection between the third middle node ND3 and the node of the ground voltage VSS, in response to the potential level of a positive node QD of the second latch LC2. The second PMOS transistor P2 may control the connection between the sensing node SO and a negative node QD_N of the second latch LC2 in response to a fifth control signal TRAND_N that is applied by the control circuit unit 301.

Referring to FIGS. 7A and 7B along with FIGS. 1, 2A and 2B, 4A and 4B, and 5A and 5B, it may be seen that an interval between timing A and timing B is the bit line setup interval BLS and an interval between timing B and timing D is the program pulse application interval PUL. Furthermore, the bit line setup interval BLS and the first interval are the same interval and the program pulse application interval PUL and the second interval are the same interval. Furthermore, FIGS. 4A and 5A may disclose an operation of the page buffer in the first interval, and FIGS. 4B and 5B may disclose an operation of the page buffer in the second interval.

Specifically, the control circuit unit 301 may generate the first control signal PB_SENSE that maintains a level HV higher than the level of the power supply voltage VCORE, that is, the level of the prohibition voltage, in each of the first interval and the second interval. That is, the control circuit unit 301 may raise the level of the first control signal PB_SENSE to the level HV higher than the level of the power supply voltage VCORE at timing A at which the first interval is started, and may continuously maintain the level HV higher than the level of the power supply voltage VCORE between timing A and timing D corresponding to the first interval and the second interval.

Furthermore, the control circuit unit 301 may maintain the level of the power supply voltage VCORE, that is, the level of the prohibition voltage, in the first interval, and may generate the second control signal SA_DISCH that maintains the level of the ground voltage VSS, that is, the level of the first permission voltage, in the second interval. That is, the control circuit unit 301 may raise the level of the second control signal SA_DISCH to the level of the power supply voltage VCORE at timing A at which the first interval is started, may drop the level of the second control signal SA_DISCH to the level of the ground voltage VSS at timing B at which the first interval is terminated and the second interval is started, and may then continuously maintain the level of the ground voltage VSS in the interval between timing B and timing D corresponding to the second interval.

Furthermore, in the case of each page buffer PBx of the multiple page buffers PB1 to PBm corresponding to FIGS. 4A and 4B, the control circuit unit 301 may generate the third control signal SA_SENSE and the fourth control signal TRAND by using a method such as a dotted line illustrated in FIG. 7A or 7B.

Specifically, in the method corresponding to FIGS. 4A and 4B and FIG. 7A, the control circuit unit 301 may generate the third control signal SA_SENSE that maintains the level of the ground voltage VSS, that is, the level of the first permission voltage, in the first interval and that maintains the level of the power supply voltage VCORE, that is, the level of the prohibition voltage, or the level HV higher than the level of the power supply voltage VCORE in the second interval. That is, the control circuit unit 301 may maintain the level of the third control signal SA_SENSE to the level of the ground voltage VSS in the interval between timing A and timing B corresponding to the first interval, may raise the level of the third control signal SA_SENSE up to the level of the power supply voltage VCORE, that is, the level of the prohibition voltage, or the level HV higher than the level of the power supply voltage VCORE at timing B at which the second interval is started, and may continuously maintain the level of the power supply voltage VCORE, that is, the level of the prohibition voltage, or the level HV higher than the level of the power supply voltage VCORE in the interval between timing B and timing D corresponding to the second interval.

Furthermore, in the method corresponding to FIGS. 4A and 4B and FIG. 7B, the control circuit unit 301 may generate the third control signal SA_SENSE that maintains the level of the power supply voltage VCORE, that is, the level of the prohibition voltage, or the level HV higher than the level of the power supply voltage VCORE in each of the first interval and the second interval. That is, the control circuit unit 301 may raise the level of the third control signal SA_SENSE to the level of the power supply voltage VCORE or the level HV higher than the power supply voltage VCORE at timing A at which the first interval is started, and may then continuously maintain the level of the power supply voltage VCORE or the level HV higher than the level of the power supply voltage VCORE between timing A and timing D corresponding to the first interval and the second interval.

Furthermore, in the method corresponding to FIGS. 4A and 4B and FIGS. 7A and 7B, the control circuit unit 301 may generate the fourth control signal TRAND that maintains the level of the ground voltage VSS, that is, the level of the first permission voltage, in the first interval and that maintains the level of the voltage VREF, that is, the sum of the level of the second permission voltage VDPGM and the level of the threshold voltage VT of the NMOS transistor, in the second interval. That is, the control circuit unit 301 may maintain the level of the fourth control signal TRAND to the level of the ground voltage VSS in the interval between timing A and timing B corresponding to the first interval, may raise the level of the fourth control signal TRAND to the level of the voltage VREF, that is, the sum of the level of the second permission voltage VDPGM and the level of the threshold voltage VT of the NMOS transistor, at timing B at which the second interval is started, and may then continuously maintain the level of the voltage VREF, that is, the sum of the level of the second permission voltage VDPGM and the level of the threshold voltage VT of the NMOS transistor, from timing B to timing D that correspond to the second interval.

Furthermore, in the case of each page buffer PBx of the multiple page buffers PB1 to PBm corresponding to FIGS. 5A and 5B, the control circuit unit 301 may generate the third control signal SA_SENSE and the fourth control signal TRAND by using a method such as a solid line illustrated in FIG. 7A or 7B.

Specifically, in the method corresponding to FIGS. 5A and 5B and FIG. 7A, the control circuit unit 301 may generate the third control signal SA_SENSE that maintains the level of the ground voltage VSS, that is, the level of the first permission voltage, in the first interval and that maintains the level of the voltage VREF, that is, the sum of the level of the second permission voltage VDPGM and the level of the threshold voltage VT of the NMOS transistor, in the second interval. That is, the control circuit unit 301 may maintain the level of the third control signal SA_SENSE to the level of the ground voltage VSS in the interval between timing A and timing B corresponding to the first interval, may raise the level of the third control signal SA_SENSE up to the level of the voltage VREF, that is, the sum of the level of the second permission voltage VDPGM and the level of the threshold voltage VT of the NMOS transistor, at timing B at which the second interval is started, and may then continuously maintain the level of the voltage VREF, that is, the sum of the level of the second permission voltage VDPGM and the level of the threshold voltage VT of the NMOS transistor, in the interval between timing B and timing D corresponding to the second interval.

Furthermore, in the method corresponding to FIGS. 5A and 5B and FIG. 7B, the control circuit unit 301 may generate the third control signal SA_SENSE that maintains the level of the voltage VREF, that is, the sum of the level of the second permission voltage VDPGM and the level of the threshold voltage VT of the NMOS transistor, in each of the first interval and the second interval. That is, the control circuit unit 301 may raise the level of the third control signal SA_SENSE to the level of the voltage VREF, that is, the sum of the level of the second permission voltage VDPGM and the level of the threshold voltage VT of the NMOS transistor, at timing A at which the first interval is started, and may then continuously maintain the level of the voltage VREF, that is, the sum of the level of the second permission voltage VDPGM and the level of the threshold voltage VT of the NMOS transistor, between timing A and timing D corresponding to the first interval and the second interval.

Furthermore, in the method corresponding to FIGS. 5A and 5B and FIGS. 7A and 7B, the control circuit unit 301 may generate the fourth control signal TRAND that maintains the level of the ground voltage VSS, that is, the level of the first permission voltage, in the first interval and that maintains the level of the power supply voltage VCORE, that is, the level of the prohibition voltage, in the second interval. That is, the control circuit unit 301 may maintain the level of the fourth control signal TRAND to the level of the ground voltage VSS in the interval between timing A and timing B corresponding to the first interval, may raise the level of the power supply voltage VCORE at timing B at which the second interval is started, and may then continuously maintain the level of the power supply voltage VCORE from timing B to timing D that correspond to the second interval.

Furthermore, in the method corresponding to FIGS. 5A and 5B and FIGS. 7A and 7B, the control circuit unit 301 may generate the fifth control signal TRAND_N by inverting the fourth control signal TRAND. That is, the control circuit unit 301 may maintain the level of the fifth control signal TRAND_N to the level of the power supply voltage VCORE in the interval between timing A and timing B corresponding to the first interval, may drop maintain the level of the fifth control signal TRAND_N to the level of the ground voltage VSS at timing B at which the second interval is started, and may then continuously maintain the level of the ground voltage VSS from timing B to timing D that correspond to the second interval.

In FIGS. 4A and 4B, in the case of the page buffer corresponding to the first bit line FIRST_BL, the level of the positive node QS of the first latch LC1 may be the logic level "1", the level of the negative node QS_N of the first latch LC1 may be the logic level "0", the level of the positive node QD of the second latch LC2 may be the logic level "1", and the level of the negative node QD_N of the second latch LC2 may be the logic level "0". Furthermore, in the case of the page buffer corresponding to the second bit line SECOND_BL, the level of the positive node QS of the first latch LC1 may be the logic level "1", the level of the negative node QS_N of the first latch LC1 may be the logic level "0", the level of the positive node QD of the second latch LC2 may be the logic level "0", and the level of the negative node QD_N of the second latch LC2 may be the logic level "1". Accordingly, in the page buffers corresponding to the first bit line FIRST_BL and the second bit line SECOND_BL, the first PMOS transistor P1 may be turned off, and the third NMOS transistor N3 may be turned on.

Furthermore, in FIGS. 4A and 4B, in the case of the page buffer corresponding to the third bit line THIRD_BL, the level of the positive node QS of the first latch LC1 may be the logic level "0", the level of the negative node QS_N of the first latch LC1 may be the logic level "1", the level of the positive node QD of the second latch LC2 may be the logic level "0", and the level of the negative node QD_N of the second latch LC2 may be the logic level "1". Accordingly, in the page buffer corresponding to the third bit line THIRD_BL, the first PMOS transistor P1 may be turned on, and the third NMOS transistor N3 may be turned off.

In the first interval corresponding to FIGS. 4A and 7A, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the power supply voltage VCORE. Both the third control signal SA_SENSE and the fourth control signal TRAND may be in the state in which the third control signal SA_SENSE and the fourth control signal TRAND have the level of the ground voltage VSS. Accordingly, both the first and second NMOS transistors N1 and N2 may have a turn-on state, and both the fourth and fifth NMOS transistors N4 and N5 may have a turn-off state.

Accordingly, in the first interval corresponding to FIGS. 4A and 7A, each of the first bit line FIRST_BL and the second bit line SECOND_BL may be in the state in which each of the first bit line FIRST_BL and the second bit line SECOND_BL has been directly connected to the node of the ground voltage VSS, that is, the first permission voltage. Furthermore, the third bit line THIRD_BL may be in the state in which the third bit line THIRD_BL has been directly connected to the node of the power supply voltage VCORE, that is, the prohibition voltage.

In the second interval corresponding to FIGS. 4B and 7A, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the ground voltage VSS. The third control signal SA_SENSE may be in the state in which the third control signal SA_SENSE has the level of the power supply voltage VCORE or the level HV higher than the level of the power supply voltage VCORE. The fourth control signal TRAND may be in the state in which the fourth control signal TRAND has the level of the voltage VREF, that is, the sum of the level of the second permission voltage VDPGM and the level of the threshold voltage VT of the NMOS transistor. Accordingly, all of the first, fourth, and fifth NMOS transistors N1, N4, and N5 may have a turn-on state, and the second NMOS transistor N2 may be turned off.

Accordingly, in the second interval corresponding to FIGS. 4B and 7A, the first bit line FIRST_BL may be in the state in which the first bit line FIRST_BL will be directly connected to the negative node QD_N of the second latch LC2 the level of which has been set as the logic level "0" corresponding to the level of the ground voltage VSS. That is, the first bit line FIRST_BL may be in the state in which the first bit line FIRST_BL has been directly connected to the node of the ground voltage VSS. Furthermore, the second bit line SECOND_BL may be in the state in which the second bit line SECOND_BL will be directly connected to the negative node QD_N of the second latch LC2 the level of which has been set as the logic level "1" corresponding to the level of the power supply voltage VCORE. At this time, the third control signal SA_SENSE may be in the state in which the third control signal SA_SENSE has the level of the power supply voltage VCORE or the level HV higher than the level of the power supply voltage VCORE. Furthermore, the fourth control signal TRAND may be in the state in which the fourth control signal TRAND has the level of the voltage VREF, that is, the sum of the level of the second permission voltage VDPGM and the level of the threshold voltage VT of the NMOS transistor. Accordingly, the second bit line SECOND_BL may be in the state in which the second permission voltage VDPGM that is transferred by the fifth NMOS transistor N5 is applied to the second bit line SECOND_BL. Furthermore, the third bit line THIRD_BL may be in the state in which the third bit line THIRD_BL has been directly connected to the node of the power supply voltage VCORE, that is, the prohibition voltage.

Furthermore, in the first interval corresponding to FIGS. 4A and 7B, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the power supply voltage VCORE. The third control signal SA_SENSE may be in the state in which the third control signal SA_SENSE has the level of the power supply voltage VCORE or the level HV higher than the level of the power supply voltage VCORE. The fourth control signal TRAND may be in the state in which the fourth control signal TRAND has the level of the ground voltage VSS. Accordingly, all of the first, second, and fourth NMOS transistors N1, N2, and N4 may have a turn-on state, and the fifth NMOS transistor N5 may be a turn-off state.

Accordingly, in the first interval corresponding to FIGS. 4A and 7B, each of the first bit line FIRST_BL and the second bit line SECOND_BL may be in the state in which each of the first bit line FIRST_BL and the second bit line SECOND_BL has been directly connected to the node of the ground voltage VSS, that is, the first permission voltage. Furthermore, the third bit line THIRD_BL may be in the state in which the third bit line THIRD_BL has been directly connected to the node of the power supply voltage VCORE, that is, the prohibition voltage.

In the second interval corresponding to FIGS. 4B and 7B, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the ground voltage VSS. The third control signal SA_SENSE may be in the state in which the third control signal SA_SENSE has the level of the power supply voltage VCORE or the level HV higher than the level of the power supply voltage VCORE. The fourth control signal TRAND may be in the state in which the fourth control signal TRAND has the level of the voltage VREF, that is, the sum of the level of the second permission voltage VDPGM and the level of the threshold voltage VT of the NMOS transistor. Accordingly, all of the first, fourth, and fifth NMOS transistors N1, N4, and N5 may have a turn-on state, and the second NMOS transistor N2 may be turned off.

Accordingly, in the second interval corresponding to FIGS. 4B and 7B, the first bit line FIRST_BL may be in the state in which the first bit line FIRST_BL will be directly connected to the negative node QD_N of the second latch LC2 the level of which has been set as the logic level "0" corresponding to the level of the ground voltage VSS. That is, the first bit line FIRST_BL may be in the state in which the first bit line FIRST_BL has been directly connected to the node of the ground voltage VSS. Furthermore, the second bit line SECOND_BL may be in the state in which the second bit line SECOND_BL will be directly connected to the negative node QD_N of the second latch LC2 the level of which has been set as the logic level "1" corresponding to the level of the power supply voltage VCORE. At this time, the third control signal SA_SENSE may be in the state in which the third control signal SA_SENSE has the level of the power supply voltage VCORE or the level HV higher than the level of the power supply voltage VCORE. Furthermore, the fourth control signal TRAND may be in the state in which the fourth control signal TRAND has the level of the voltage VREF, that is, the sum of the level of the second permission voltage VDPGM and the level of the threshold voltage VT of the NMOS transistor. Accordingly, the second bit line SECOND_BL may be in the state in which the second permission voltage VDPGM that is transferred by the fifth NMOS transistor N5 is applied to the second bit line SECOND_BL. Furthermore, the third bit line THIRD_BL may be in the state in which the third bit line THIRD_BL has been directly connected to the node of the power supply voltage VCORE, that is, the prohibition voltage.

Furthermore, in FIGS. 5A and 5B, in the case of the page buffer corresponding to the first bit line FIRST_BL, the level of the positive node QS of the first latch LC1 may be the logic level "1", the level of the negative node QS_N of the first latch LC1 may be the logic level "0", the level of the positive node QD of the second latch LC2 may be the logic level "1", and the level of the negative node QD_N of the second latch LC2 may be the logic level "0". Accordingly, in the page buffer corresponding to the first bit line FIRST_BL, the first PMOS transistor P1 may be turned off, the third NMOS transistor N3 may be turned on, and the sixth NMOS transistor N6 may be turned on.

Furthermore, in FIGS. 5A and 5B, in the case of the page buffer corresponding to the second bit line SECOND_BL, the level of the positive node QS of the first latch LC1 may be the logic level "1", the level of the negative node QS_N of the first latch LC1 may be the logic level "0", the level of the positive node QD of the second latch LC2 may be the logic level "0", and the level of the negative node QD_N of the second latch LC2 may be the logic level "1". Accordingly, in the page buffer corresponding to the second bit line SECOND_BL, the first PMOS transistor P1 may be turned off, the third NMOS transistor N3 may be turned on, and the sixth NMOS transistor N6 may be turned off.

Furthermore, in FIGS. 5A and 5B, in the case of the page buffer corresponding to the third bit line THIRD_BL, the level of the positive node QS of the first latch LC1 may be the logic level "0", the level of the negative node QS_N of the first latch LC1 may be the logic level "1", the level of the positive node QD of the second latch LC2 may be the logic level "0", the level of the negative node QD_N of the second latch LC2 may be the logic level "1". Accordingly, in the page buffer corresponding to the third bit line THIRD_BL, the first PMOS transistor P1 may be turned on, the third NMOS transistor N3 may be turned off, and the sixth NMOS transistor N6 may be turned off.

In the first interval corresponding to FIGS. 5A and 7A, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the power supply voltage VCORE. Both the third control signal SA_SENSE and the fourth control signal TRAND may be in the state in which the third control signal SA_SENSE and the fourth control signal TRAND have the level of the ground voltage VSS. The fifth control signal TRAND_N may be in the state in which the fifth control signal TRAND_N has the level of the power supply voltage VCORE. Accordingly, both the first and second NMOS transistors N1 and N2 may have a turn-on state, and all of the fourth and fifth NMOS transistors N4 and N5 and the second PMOS transistor P2 may have a turn-off state.

Accordingly, each of the first bit line FIRST_BL and the second bit line SECOND_BL may be in the state in which each of the first bit line FIRST_BL and the second bit line SECOND_BL has been directly connected to the node of the ground voltage VSS, that is, the first permission voltage. Furthermore, the third bit line THIRD_BL may be in the state in which the third bit line THIRD_BL has been directly connected to the node of the power supply voltage VCORE, that is, the prohibition voltage.

In the second interval corresponding to FIGS. 5B and 7A, the first control signal PB_SENSE may be in the state in which the first control signal PB_SENSE has the level HV higher than the level of the power supply voltage VCORE. The second control signal SA_DISCH and the fifth control signal TRAND_N may be in the state in which the second control signal SA_DISCH and the fifth control signal TRAND_N have the level of the ground voltage VSS. The third control signal SA_SENSE may be in the state in which the third control signal SA_SENSE has the level of the voltage VREF, that is, the sum of the level of the second permission voltage VDPGM and the level of the threshold voltage VT of the NMOS transistor. The fourth control signal TRAND may be in the state in which the fourth control signal TRAND has the level of the power supply voltage VCORE. Accordingly, all of the first, fourth, and fifth NMOS transistors N1, N4, and N5 and the second PMOS transistor P2 may have a turn-on state, and the second NMOS transistor N2 may be turned off.

Accordingly, the first bit line FIRST_BL may be in the state in which the first bit line FIRST_BL has been directly connected to the node of the ground voltage VSS, that is, the first permission voltage. Furthermore, the second bit line SECOND_BL may be in the state in which the second bit line SECOND_BL will be directly connected to the negative node QD_N of the second latch LC2 the level of which has been set as the logic level "1" corresponding to the level of the power supply voltage VCORE. At this time, since the third control signal SA_SENSE is in the state in which the third control signal SA_SENSE has the level of the voltage VREF, that is, the sum of the level of the second permission voltage VDPGM and the level of the threshold voltage VT of the NMOS transistor, the second bit line SECOND_BL may be in the state in which the second permission voltage VDPGM that is transferred by the fourth NMOS transistor N4 is applied to the second bit line SECOND_BL. Furthermore, the third bit line THIRD_BL may be in the state in which the node of the power supply voltage VCORE, that is, the prohibition voltage, has been directly connected to the third bit line THIRD_BL.

Furthermore, in the first interval corresponding to FIGS. 5A and 7B, the first control signal PB_SENSE may be in the state in which the first control signal PB_SENSE has the level HV higher than the level of the power supply voltage VCORE. The second control signal SA_DISCH may be in the state in which the second control signal SA_DISCH has the level of the power supply voltage VCORE. The third control signal SA_SENSE may be in the state in which the third control signal SA_SENSE has the level of the voltage VREF, that is, the sum of the level of the second permission voltage VDPGM and the level of the threshold voltage VT of the NMOS transistor. The fourth control signal TRAND may be in the state in which the fourth control signal TRAND has the level of the ground voltage VSS. The fifth control signal TRAND_N may be in the state in which the fifth control signal TRAND_N has the level of the power supply voltage VCORE. Accordingly, all of the first, second, and fourth NMOS transistors N1, N2, and N4 may have a turn-on state, and both the fifth NMOS transistor N5 and the second PMOS transistor P2 may have a turn-off state.

Accordingly, each of the first bit line FIRST_BL and the second bit line SECOND_BL may be in the state in which each of the first bit line FIRST_BL and the second bit line SECOND_BL has been directly connected to the node of the ground voltage VSS, that is, the first permission voltage. Furthermore, the third bit line THIRD_BL may be in the state in which the third bit line THIRD_BL has been directly connected to the node of the power supply voltage VCORE, that is, the prohibition voltage.

In the second interval corresponding to FIGS. 5B and 7B, the first control signal PB_SENSE may be in the state in which the first control signal PB_SENSE has the level HV higher than the level of the power supply voltage VCORE. The second control signal SA_DISCH and the fifth control signal TRAND_N may be in the state in which the second control signal SA_DISCH and the fifth control signal TRAND_N have the level of the ground voltage VSS. The third control signal SA_SENSE may be in the state in which the third control signal SA_SENSE has the level of the voltage VREF, that is, the sum of the level of the second permission voltage VDPGM and the level of the threshold voltage VT of the NMOS transistor. The fourth control signal TRAND may be in the state in which the fourth control signal TRAND has the level of the power supply voltage VCORE. Accordingly, all of the first, fourth, and fifth NMOS transistors N1, N4, and N5 and the second PMOS transistor P2 may have a turn-on state, and the second NMOS transistor N2 may be turned off.

Accordingly, the first bit line FIRST_BL may be in the state in which the first bit line FIRST_BL has been directly connected to the node of the ground voltage VSS, that is, the first permission voltage. Furthermore, the second bit line SECOND_BL may be in the state in which the second bit line SECOND_BL will be directly connected to the negative node QD_N of the second latch LC2 the level of which has been set as the logic level "1" corresponding to the level of the power supply voltage VCORE. At this time, since the third control signal SA_SENSE is in the state in which the third control signal SA_SENSE has the level of the voltage VREF, that is, the sum of the level of the second permission voltage VDPGM and the level of the threshold voltage VT of the NMOS transistor, the second bit line SECOND_BL may be in the state in which the second permission voltage VDPGM that is transferred by the fourth NMOS transistor N4 is applied to the second bit line SECOND_BL. Furthermore, the third bit line THIRD_BL may be in the state in which the third bit line THIRD_BL has been directly connected to the node of the power supply voltage VCORE, that is, the prohibition voltage.

Referring to FIGS. 8A and 8B along with FIGS. 1, 2A, 2B, 4A, 4B, 5A, and 5B, it may be seen that an interval between timing A and timing B is the bit line setup interval BLS and an interval between timing B and timing D is the program pulse application interval PUL. Furthermore, an interval between timing A and timing E is the first interval and an interval between timing E and timing D is the second interval. That is, the first interval is longer than the bit line setup interval BLS and the second interval is shorter than the program pulse application interval PUL. Accordingly, the first interval may have a form in which the first interval at least partially overlaps the program pulse application interval PUL. That is, an interval between timing B and timing E may be the first interval and may also be the program pulse application interval PUL. Furthermore, FIGS. 4A and 5A disclose an operation of the page buffer in the first interval. FIGS. 4B and 5B disclose an operation of the page buffer in the second interval.

In FIGS. 7A and 7B, the first interval and the bit line setup interval BLS are identical with each other and the second interval and the program pulse application interval PUL are identical with each other as described above. Accordingly, a difference between FIGS. 7A and 7B and FIGS. 8A and 8B may be that the lengths of the first interval and the second interval are different from each other. Methods that are applied to the page buffers disclosed in FIGS. 4A and 4B and FIGS. 5A and 5B are fully the same except that the first interval and the second interval have different lengths as described above. Accordingly, a description of operations disclosed in FIGS. 8A and 8B, which have been applied to the constructions of the page buffers disclosed in FIGS. 4A and 4B and FIGS. 5A and 5B, will be omitted.

Specifically, the program pulse application interval PUL corresponding to the interval between timing B and timing D may be divided into a first program pulse application interval between timing B and timing C and a second program pulse application interval between timing C and timing D. The control circuit unit 301 may apply a first program voltage VPASS to each of a word line selected as a program target and an unselected word line, among multiple word lines WL<1:n>, in the first program pulse application interval. The control circuit unit 301 may apply a second program VPGM having a level higher than the level of the first program voltage VPASS to a word line selected as a program target, among the multiple word lines WL<1:n>, and may apply the first program voltage VPASS to a word line not selected as the program target, among the multiple word lines WL<1:n>, in the second program pulse application interval.

At this time, the control circuit unit 301 may set timing at which the second interval is started, as timing E that is later than timing B and that is earlier than timing C. Accordingly, the control circuit unit 301 may set the first interval so that the first interval at least partially overlaps the first program pulse application interval and does not overlap the second program pulse application interval.

Specifically, the control circuit unit 301 may generate the first control signal PB_SENSE that maintains the level HV higher than the level of the power supply voltage VCORE, that is, the level of the prohibition voltage, in each of the first interval and the second interval. That is, the control circuit unit 301 may raise the level of the first control signal PB_SENSE to the level HV higher than the level of the power supply voltage VCORE at timing A at which the first interval is started, and may then continuously maintain the level of the first control signal PB_SENSE to the level HV higher than the level of the power supply voltage VCORE between timing A and timing D corresponding to the first interval and the second interval.

Furthermore, the control circuit unit 301 may generate the second control signal SA_DISCH that maintains the level of the power supply voltage VCORE, that is, the level of the prohibition voltage, in the first interval and that maintains the level of the ground voltage VSS, that is, the level of the first permission voltage, in the second interval. That is, the control circuit unit 301 may raise the level of the second control signal SA_DISCH to the level of the power supply voltage VCORE at timing A at which the first interval is started, may drop the level of the second control signal SA_DISCH to the level of the ground voltage VSS at timing E at which the first interval is terminated and the second interval is started, and may then continuously maintain the level of the ground voltage VSS between timing E and timing D corresponding to the second interval.

Furthermore, in the case of each page buffer PBx of the multiple page buffers PB1 to PBm corresponding to FIGS. 4A and 4B, the control circuit unit 301 may generate the third control signal SA_SENSE and the fourth control signal TRAND by using a method such as a dotted line illustrated in FIG. 8A or 8B.

Specifically, in the method corresponding to FIGS. 4A and 4B and FIG. 8A, the control circuit unit 301 may generate the third control signal SA_SENSE that maintains the level of the ground voltage VSS, that is, the level of the first permission voltage, in the first interval and that maintains the level of the power supply voltage VCORE, that is, the level of the prohibition voltage, or the level HV higher than the level of the power supply voltage VCORE in the second interval. That is, the control circuit unit 301 may maintain the level of the third control signal SA_SENSE to the level of the ground voltage VSS between timing A and timing E corresponding to the first interval, may raise the level of the third control signal SA_SENSE up to the level of the power supply voltage VCORE, that is, the level of the prohibition voltage, or the level HV higher than the level of the power supply voltage VCORE at timing E at which the second interval is started, and may then continuously maintain the level of the power supply voltage VCORE, that is, the level of the prohibition voltage, or the level HV higher than the level of the power supply voltage VCORE between timing E and timing D corresponding to the second interval.

Furthermore, in the method corresponding to FIGS. 4A and 4B and FIG. 8B, the control circuit unit 301 may generate the third control signal SA_SENSE that maintains the level of the power supply voltage VCORE, that is, the level of the prohibition voltage, or the level HV higher than the level of the power supply voltage VCORE in each of the first interval and the second interval. That is, the control circuit unit 301 may raise the level of the third control signal SA_SENSE to the level of the power supply voltage VCORE or the level HV higher than the power supply voltage VCORE at timing A at which the first interval is started, and may then continuously maintain the level of the power supply voltage VCORE or the level HV higher than the level of the power supply voltage VCORE between timing A and timing D corresponding to the first interval and the second interval.

Furthermore, in the method corresponding to FIGS. 4A and 4B and FIGS. 8A and 8B, the control circuit unit 301 may generate the fourth control signal TRAND that maintains the level of the ground voltage VSS, that is, the level of the first permission voltage, in the first interval and that maintains the level of the voltage VREF, that is, the sum of the level of the second permission voltage VDPGM and the level of the threshold voltage VT of the NMOS transistor, in the second interval. That is, the control circuit unit 301 may maintain the level of the fourth control signal TRAND to the level of the ground voltage VSS between timing A and timing E corresponding to the first interval, may raise the level of the fourth control signal TRAND to the level of the voltage VREF, that is, the sum of the level of the second permission voltage VDPGM and the level of the threshold voltage VT of the NMOS transistor, at timing E at which the second interval is started, and may then continuously maintain the level of the voltage VREF, that is, the sum of the level of the second permission voltage VDPGM and the level of the threshold voltage VT of the NMOS transistor, from timing E to timing D corresponding to the second interval.

Furthermore, in the case of each page buffer PBx of the multiple page buffers PB1 to PBm corresponding to FIGS. 5A and 5B, the control circuit unit 301 may generate the third control signal SA_SENSE and the fourth control signal TRAND by using a method such as a solid line illustrated in FIG. 8A or 8B.

Specifically, in the method corresponding to FIGS. 5A and 5B and FIG. 8A, the control circuit unit 301 may generate the third control signal SA_SENSE that maintains the level of the ground voltage VSS, that is, the level of the first permission voltage, in the first interval and that maintains the level of the voltage VREF, that is, the sum of the level of the second permission voltage VDPGM and the level of the threshold voltage VT of the NMOS transistor, in the second interval. That is, the control circuit unit 301 may maintain the level of the third control signal SA_SENSE to the level of the ground voltage VSS between timing A and timing E corresponding to the first interval, may raise the level of the third control signal SA_SENSE up to the level of the voltage VREF, that is, the sum of the level of the second permission voltage VDPGM and the level of the threshold voltage VT of the NMOS transistor, at timing E at which the second interval is started, and may then continuously maintain the level of the voltage VREF, that is, the sum of the level of the second permission voltage VDPGM and the level of the threshold voltage VT of the NMOS transistor, between timing E and timing D corresponding to the second interval.

Furthermore, in the method corresponding to FIGS. 5A and 5B and FIG. 8B, the control circuit unit 301 may generate the third control signal SA_SENSE that maintains the level of the voltage VREF, that is, the sum of the level of the second permission voltage VDPGM and the level of the threshold voltage VT of the NMOS transistor, in each of the first interval and the second interval. That is, the control circuit unit 301 may raise the level of the third control signal SA_SENSE to the level of the voltage VREF, that is, the sum of the level of the second permission voltage VDPGM and the level of the threshold voltage VT of the NMOS transistor, at timing A at which the first interval is started, and may then continuously maintain the level of the voltage VREF, that is, the sum of the level of the second permission voltage VDPGM and the level of the threshold voltage VT of the NMOS transistor, between timing A and timing D corresponding to the first interval and the second interval.

Furthermore, in the method corresponding to FIGS. 5A and 5B and FIGS. 8A and 8B, the control circuit unit 301 may generate the fourth control signal TRAND that maintains the level of the ground voltage VSS, that is, the level of the first permission voltage, in the first interval and that maintains the level of the power supply voltage VCORE in the second interval. That is, the control circuit unit 301 may maintain the level of the fourth control signal TRAND to the level of the ground voltage VSS between timing A and timing E corresponding to the first interval, may raise the level of the fourth control signal TRAND to the level of the power supply voltage VCORE at timing E at which the second interval is started, and may then continuously maintain the level of the power supply voltage VCORE from timing E to timing D corresponding to the second interval.

Furthermore, in the method corresponding to FIGS. 5A and 5B and FIGS. 8A and 8B, the control circuit unit 301 may generate the fifth control signal TRAND_N by inverting the fourth control signal TRAND. That is, the control circuit unit 301 may maintain the level of the fifth control signal TRAND_N to the level of the power supply voltage VCORE between timing A and timing E corresponding to the first interval, may drop the level of the fifth control signal TRAND_N to the level of the ground voltage VSS at timing E at which the second interval is started, and may then continuously maintain the level of the ground voltage VSS from timing E to timing D corresponding to the second interval.

It will be evident to a person having ordinary knowledge in the art to which the present disclosure pertains that the present disclosure described above is not limited by the aforementioned embodiments and the accompanying drawings and that the present disclosure may be substituted, modified, and changed in various ways without departing from the technical spirit of the present disclosure.

For example, the locations and types of the logic gates and the transistors illustrated in the aforementioned embodiments have to be differently implemented depending on the polarity of an input signal.

While the present invention has been illustrated and described with respect to specific embodiments, these embodiments are not intended to be restrictive, but rather descriptive. Further, it is noted that the present invention may be achieved in various ways through substitution, change, and modification, as would be understood by those skilled in the art, without departing from the spirit and/or scope of the present invention as defined by the following claims. Furthermore, the embodiments may be combined to form additional embodiments.

What is claimed is:

1. A memory device comprising:
a memory cell array comprising multiple memory cells that are connected between multiple word lines and multiple bit lines; and
a controller configured to:
connect, in a first interval equal to or longer than a bit line setup interval, each of first and second bit lines, which are connected to cells respectively having first and second program states among the multiple memory cells, to a node of a first permission voltage,
connect, in the first interval, a third bit line, which is connected to a cell having a program prohibition state, to a node of a prohibition voltage,
maintain, in a second interval that is equal to or shorter than a program pulse application interval and subsequent to the first interval, the connection between the first bit line and the node of the first permission voltage and the connection between the third bit line and the node of the prohibition voltage, and
disconnect, in the second interval, the second bit line from the node of the first permission voltage to apply the second bit line with a second permission voltage having a level between a level of the prohibition voltage and a level of the first permission voltage.

2. The memory device of claim 1, wherein the first interval and the pulse application interval at least partially overlap each other.

3. The memory device of claim 2,
wherein the controller is further configured to:
apply, in a first pulse application interval within the pulse application interval, a first program voltage to each of a selected word line and an unselected word line among the multiple word lines, and
apply, in a second pulse application interval subsequent to the first pulse application interval within the pulse application interval, a second program voltage higher than the first program voltage to the selected word line and the first program voltage to the unselected word line, and
wherein the first interval and the first pulse application interval at least partially overlap each other.

4. The memory device of claim 1, wherein the first interval and the pulse application interval do not overlap each other.

5. The memory device of claim 1, wherein the controller comprises:
a page buffer unit comprising multiple page buffers connected to the multiple memory cells through the multiple bit lines, respectively, and each including first and second latches; and
a control circuit unit configured to:
adjust storage levels of the first and second latches based on a bit line connected to each of the multiple page buffers among the first to third bit lines, and
adjust a potential level of each of the first to third bit lines by controlling operations of the multiple page buffers during the first and second intervals.

6. The memory device of claim 5, wherein each of the multiple page buffers comprises:
an NMOS transistor configured to control a connection between a first middle node and one of the multiple bit lines in response to a first control signal that is applied by the control circuit unit;
an NMOS transistor configured to control a connection between the first middle node and a second middle node in response to a second control signal that is applied by the control circuit unit;
a PMOS transistor configured to control a connection between the first middle node and the node of the prohibition voltage in response to a potential level of a positive node of the first latch that is included in each page buffer;
an NMOS transistor configured to control a connection between the second middle node and the node of the first permission voltage in response to the potential level of the positive node of the first latch that is included in each page buffer;
an NMOS transistor configured to control a connection between the first middle node and a sensing node in response to a third control signal that is applied by the control circuit unit; and
an NMOS transistor configured to control a connection between the sensing node and a negative node of the second latch that is included in each page buffer, in response to a fourth control signal that is applied by the control circuit unit.

7. The memory device of claim 6, wherein the control circuit unit is further configured to:
generate the first control signal that maintains a voltage level higher than the level of the prohibition voltage in each of the first and second intervals,
generate the second control signal that maintains the level of the prohibition voltage in the first interval and the level of the first permission voltage in the second interval,
generate the third control signal that maintains the level of the first permission voltage in the first interval and the level of the prohibition voltage or a voltage level higher than the level of the prohibition voltage in the second interval, and
generate the fourth control signal that maintains the level of the first permission voltage in the first interval and a voltage level of a sum of the level of the second permission voltage and a threshold voltage level of the NMOS transistor in the second interval.

8. The memory device of claim 6, wherein the control circuit unit is further configured to:
generate the first control signal that maintains a voltage level higher than the level of the prohibition voltage in each of the first and second intervals,
generate the second control signal that maintains the level of the prohibition voltage in the first interval and the level of the first permission voltage in the second interval,
generate the third control signal that maintains the level of the prohibition voltage or the voltage level higher than the level of the prohibition voltage in each of the first and second intervals, and
generate the fourth control signal that maintains the level of the first permission voltage in the first interval and a voltage level of a sum of the level of the second permission voltage and a threshold voltage level of the NMOS transistor in the second interval.

9. The memory device of claim 5, wherein each of the multiple page buffers comprises:
an NMOS transistor configured to control a connection between a first middle node and one of the multiple bit lines in response to a first control signal that is applied by the control circuit unit;
an NMOS transistor configured to control a connection between the first middle node and a second middle node in response to a second control signal that is applied by the control circuit unit;
a PMOS transistor configured to control a connection between the first middle node and the node of the prohibition voltage in response to a potential level of a positive node of the first latch that is included in each page buffer;
an NMOS transistor configured to control a connection between the second middle node and the node of the first permission voltage in response to the potential level of the positive node of the first latch that is included in each page buffer;
an NMOS transistor configured to control a connection between the first middle node and a sensing node in response to a third control signal that is applied by the control circuit unit;
an NMOS transistor configured to control a connection between a third middle node and the sensing node in response to a fourth control signal that is applied by the control circuit unit;
an NMOS transistor configured to control a connection between the third middle node and the node of the first permission voltage in response to a potential level of a positive node of the second latch that is included in each page buffer; and
a PMOS transistor configured to control a connection between the sensing node and a negative node of the second latch, which is included in the second latch, in response to a fifth control signal that is applied by the control circuit unit.

10. The memory device of claim 9, wherein the control circuit unit is further configured to:
generate the first control signal that maintains a voltage level higher than the level of the prohibition voltage in each of the first and second intervals,
generate the second control signal that maintains the level of the prohibition voltage in the first interval and the level of the first permission voltage in the second interval,
generate the third control signal that maintains the level of the first permission voltage in the first interval and a voltage level of a sum of the level of the second permission voltage and the threshold voltage level of the NMOS transistor in the second interval,
generate the fourth control signal that maintains the level of the first permission voltage in the first interval and the level of the prohibition voltage in the second interval, and
generate the fifth control signal by inverting the fourth control signal.

11. The memory device of claim 9, wherein the control circuit unit is further configured to:
generate the first control signal that maintains a voltage level higher than the level of the prohibition voltage in each of the first and second intervals,
generate the second control signal that maintains the level of the prohibition voltage in the first interval and the level of the first permission voltage in the second interval,
generate the third control signal that maintains a voltage level of a sum of the level of the second permission voltage and a threshold voltage level of the NMOS transistor in each of the first and second intervals,
generate the fourth control signal that maintains the level of the first permission voltage in the first interval and the level of the prohibition voltage in the second interval, and
generate the fifth control signal by inverting the fourth control signal.

12. The memory device of claim 5, wherein the control circuit unit is further configured to set:
a level of a positive node of the first latch, which is included in a page buffer connected to the first bit line, to the level of the prohibition voltage,
a level of a negative node of the first latch, which is included in the page buffer connected to the first bit line, to the level of the first permission voltage,
a level of a positive node of the second latch, which is included in the page buffer connected to the first bit line, to the level of the prohibition voltage,
a level of a negative node of the second latch, which is included in the page buffer connected to the first bit line, to the level of the first permission voltage,
a level of a positive node of the first latch, which is included in a page buffer connected to the second bit line, to the level of the prohibition voltage,
a level of a negative node of the first latch, which is included in the page buffer connected to the second bit line, to the level of the first permission voltage,
a positive node of the second latch, which is included in the page buffer connected to the second bit line, to the level of the first permission voltage,
a negative node of the second latch, which is included in the page buffer connected to the second bit line, to the level of the prohibition voltage,
a level of a positive node of the first latch, which is included in a page buffer connected to the third bit line, to the level of the first permission voltage,
a level of a negative node of the first latch, which is included in the page buffer connected to the third bit line, to the level of the prohibition voltage,
a level of a positive node of the second latch, which is included in the page buffer connected to the third bit line, to the level of the first permission voltage, and a level of a negative node of the second latch, which is included in the page buffer connected to the third bit line, to the level of the prohibition voltage.

13. The memory device of claim 1, wherein:
the first permission voltage has a level of a ground voltage or a level of a negative voltage lower than the ground voltage, and
the prohibition voltage has the level of a power supply voltage.

14. An operating method of a memory device, the operating method comprising:
performing a bit line setup operation between first timing and second timing;
performing a program pulse application operation between the second timing and third timing;
connecting first and second bit lines, which are connected to cells having first and second program states, to a node of a first permission voltage and connecting a third bit line, which is connected to a cell having a program prohibition state, to a node of a prohibition voltage, between the first timing and fourth timing that is equal to or later than the second timing and that is earlier than the third timing; and
maintaining the connection between the first bit line and the node of the first permission voltage and the connection between the third bit line and the node of the prohibition voltage, disconnecting the connection of the second bit line and supplying the second bit line with a second permission voltage having a level between a level of the prohibition voltage and a level of the first permission voltage, between the fourth timing and the third timing.

15. The operating method of claim 14, wherein the program pulse application operation comprises:
a first pulse application operation of applying a first program voltage to each of a selected word line and an unselected word line between the second timing and fifth timing that is later than the fourth timing and that is earlier than the third timing; and
a second pulse application operation of applying a second program voltage higher than the first program voltage to the selected word line and the first program voltage to the unselected word line between the fifth timing and the third timing.

16. The operating method of claim 14, wherein:
the first permission voltage is a voltage having a level of a ground voltage or a level of a negative voltage lower than the ground voltage, and
the prohibition voltage is a voltage having a level of a power supply voltage.

17. A memory device comprising:
a memory cell array coupled to word lines and bit lines; and
a control circuit configured to perform a program operation on the array by:
performing a bit line setup operation during a time section A,
performing a program pulse application operation during a time section B,
applying, to a first bit line of the bit lines, the first permission voltage during a time section C and a second permission voltage during a time section D, and
applying, respectively to second and third bit lines of the bit lines, a first permission voltage and a prohibition voltage during the time sections C and D,
wherein memory cells coupled to the first and second bit lines have different program states and a memory cell coupled to the third bit line has a program prohibition state,
wherein the time section A is defined by first and second time points,
wherein the time section B is defined by the second time point and a third time point,
wherein the time section C is defined by the first time point and a fourth time point, which is between the second and third time points,
wherein the time section D is defined by the fourth and third time points, and
wherein the second permission voltage has a level between the prohibition voltage and the first permission voltage.

18. The memory device of claim 17,
wherein the control circuit performs the program pulse application operation by:
applying a first program voltage to selected and unselected word lines during a time section E, and
applying a second program voltage to the selected word line and the first program voltage to the unselected word line during a time section F,
wherein the time section E is defined by the second time point and a fifth time point, which is between the fourth and third time points,
wherein the time section F is defined by the fifth and third time points, and
wherein the second program voltage is higher than the first program voltage.

* * * * *